July 19, 1938.  F. L. O. WADSWORTH  2,124,091
APPARATUS FOR THE FABRICATION OF GLASS ARTICLES
Filed Jan. 18, 1935  9 Sheets-Sheet 1
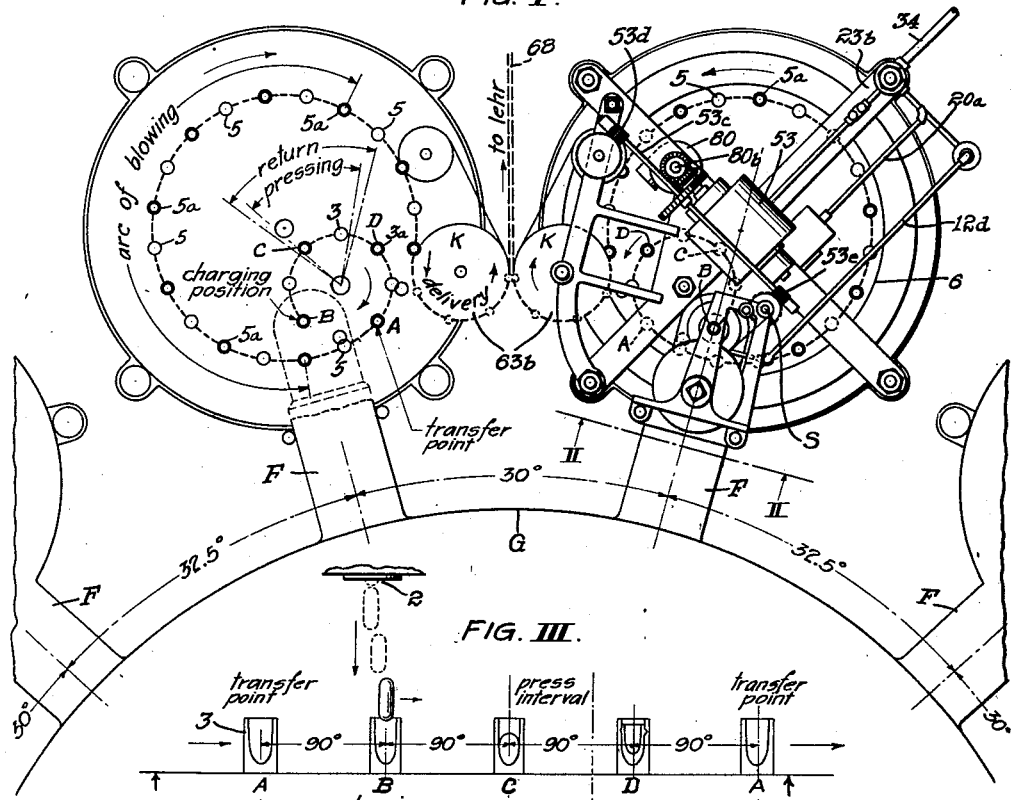
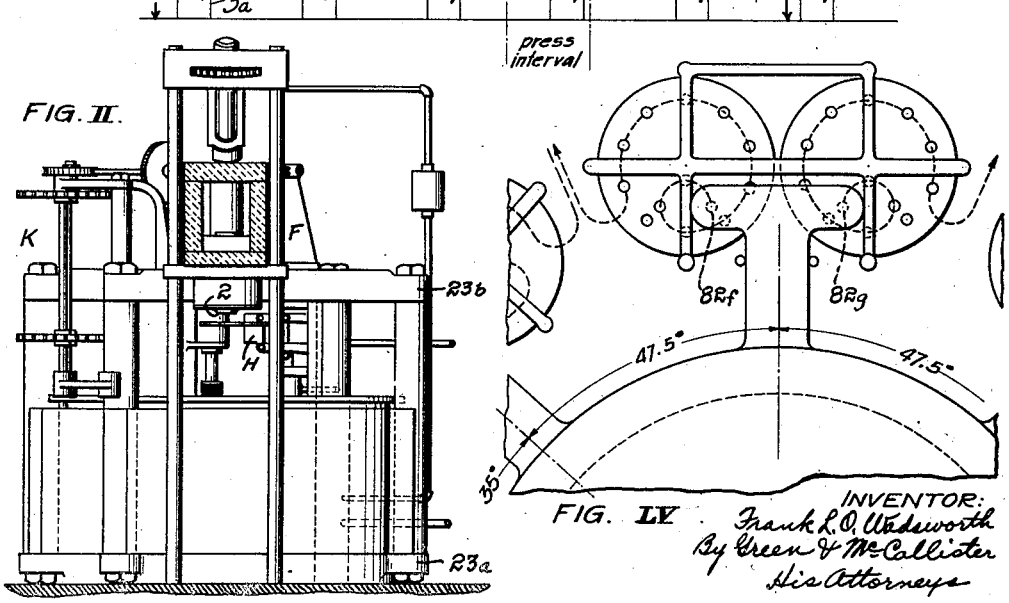

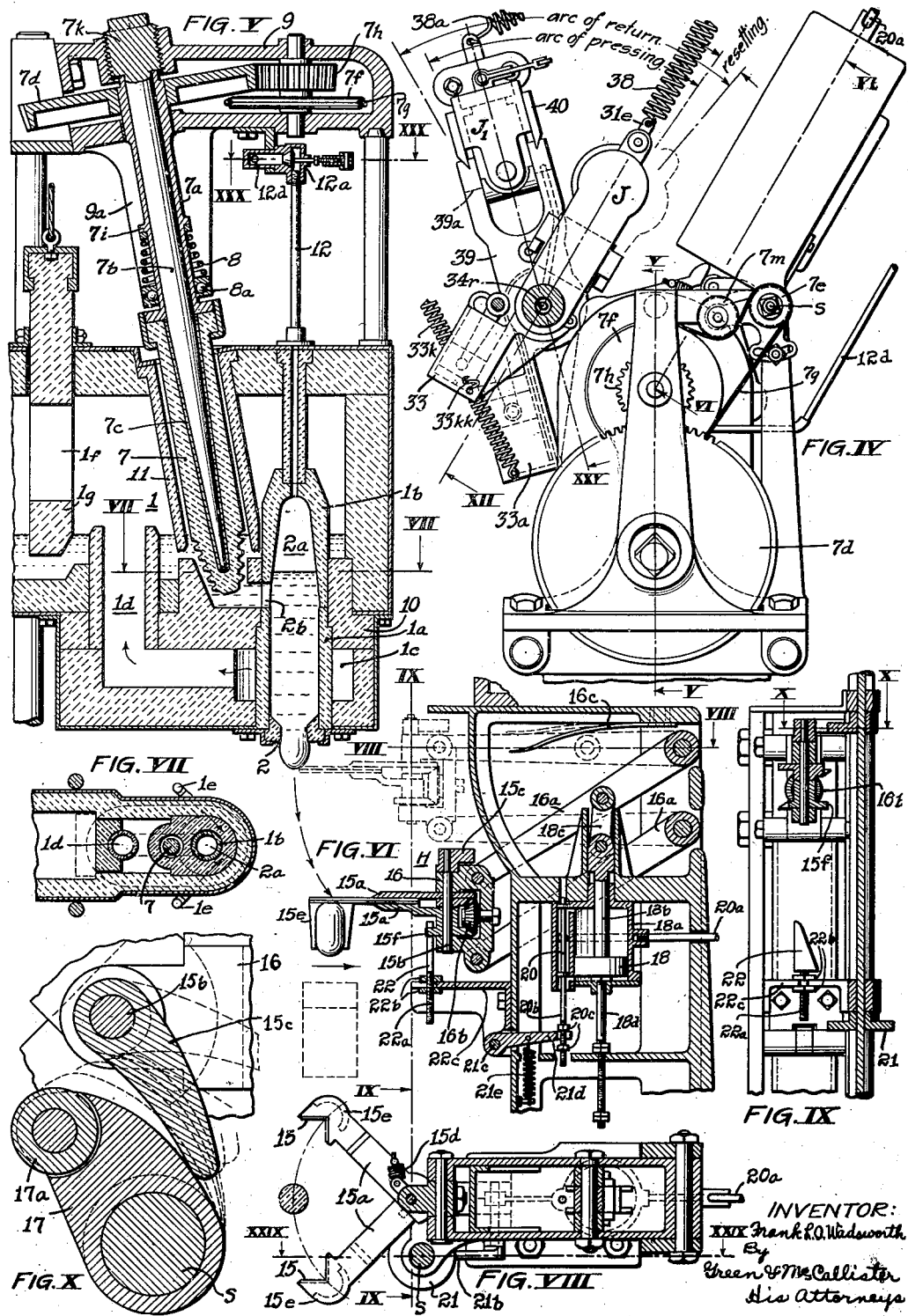

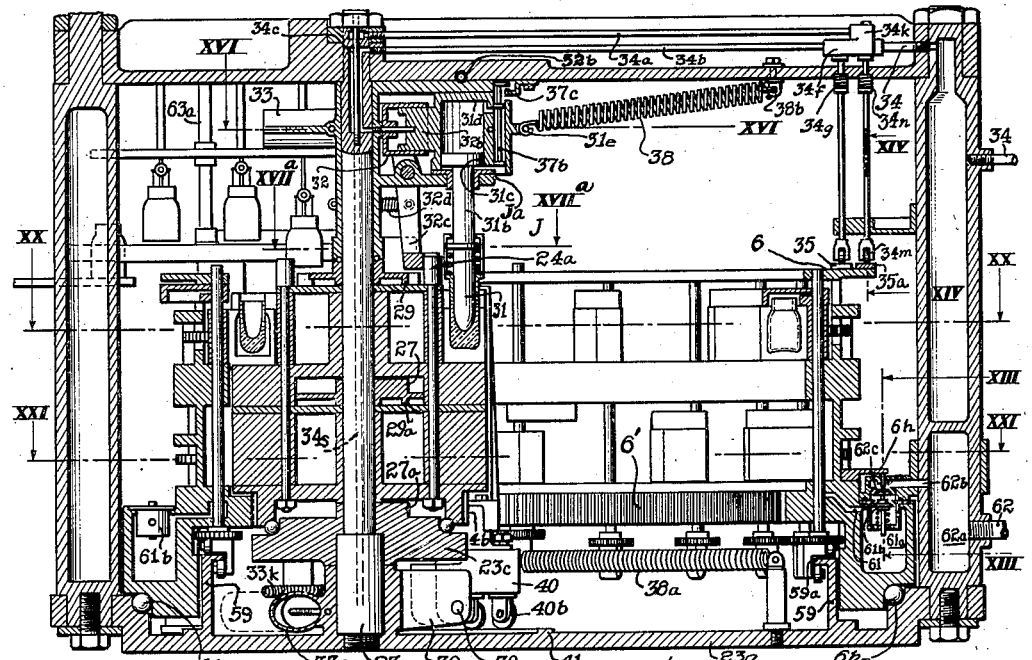
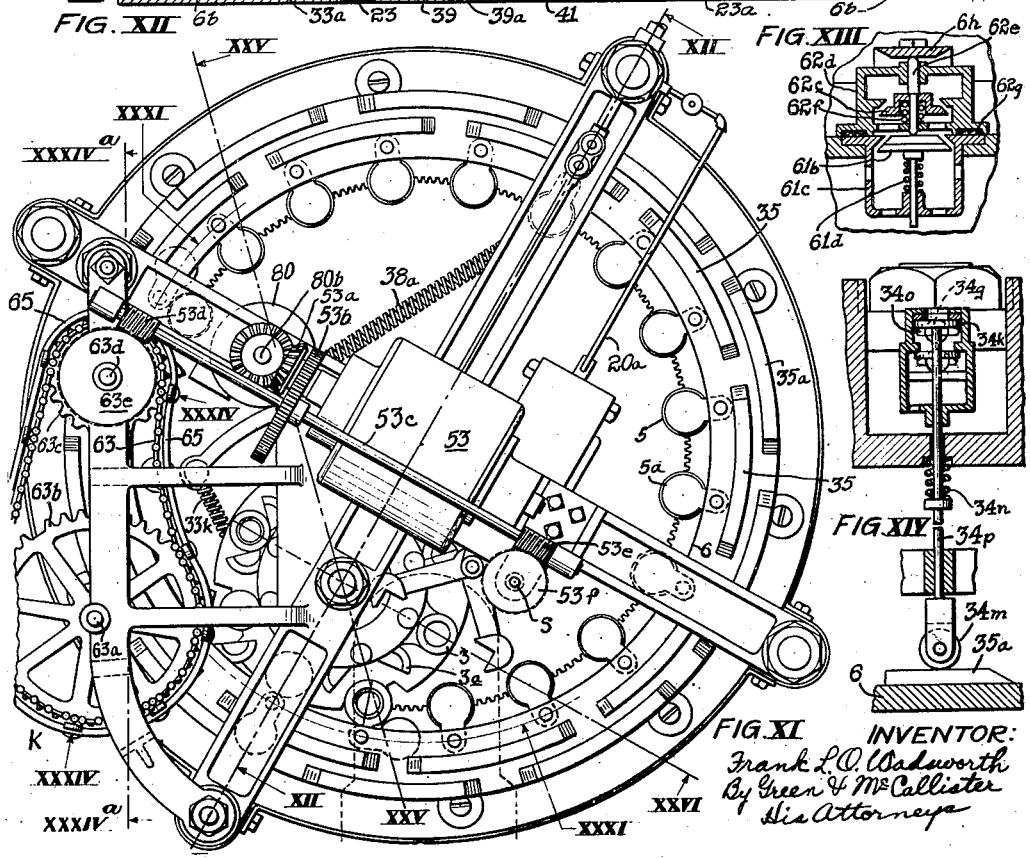

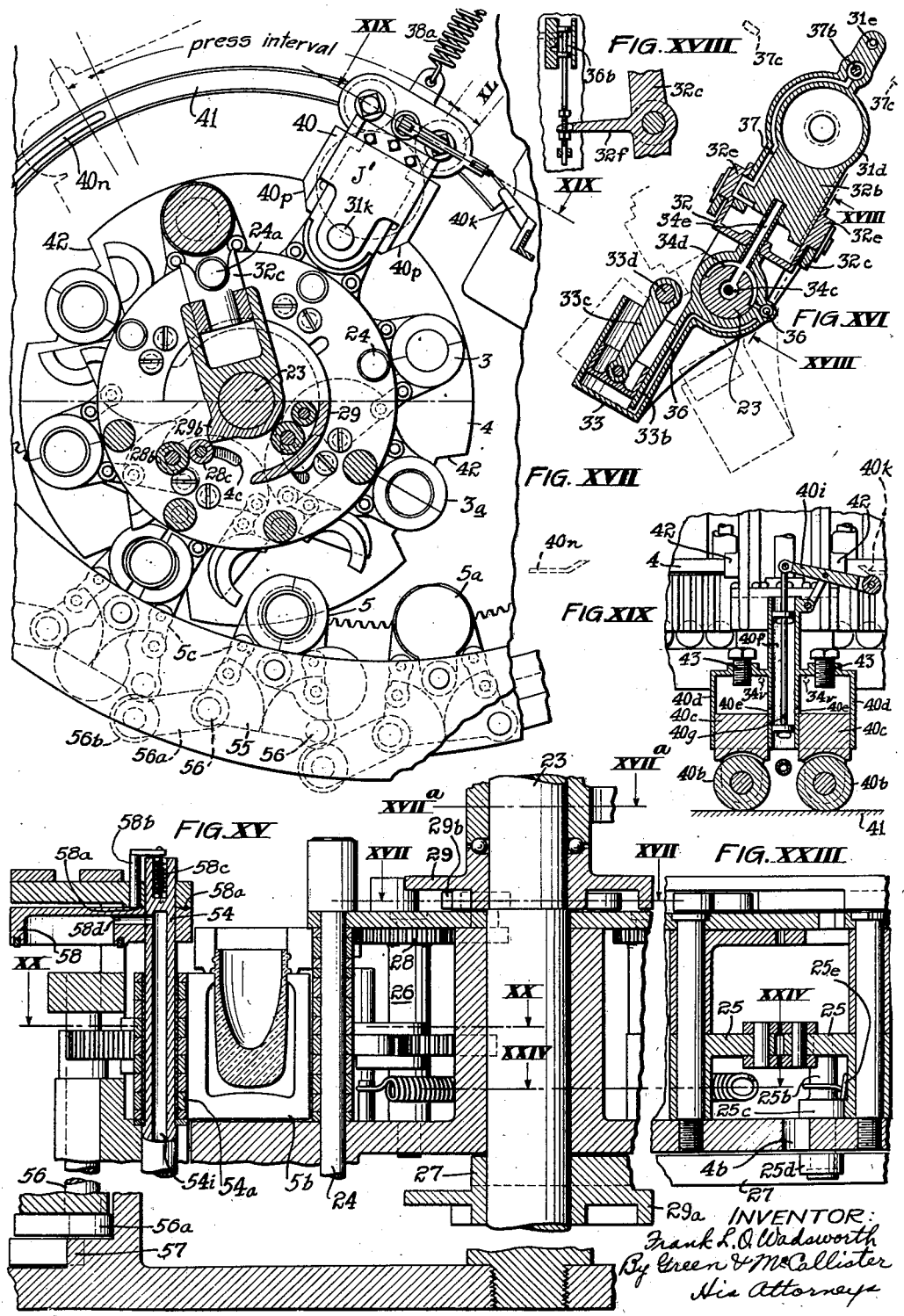

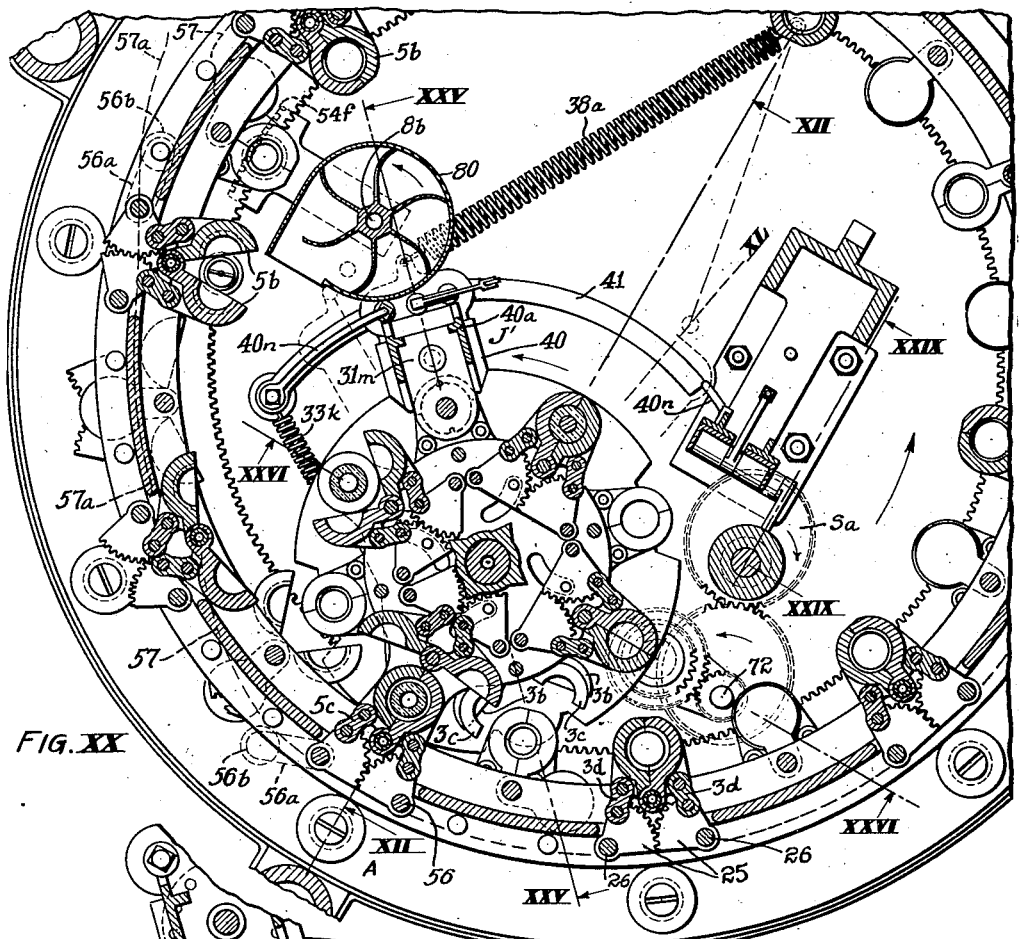
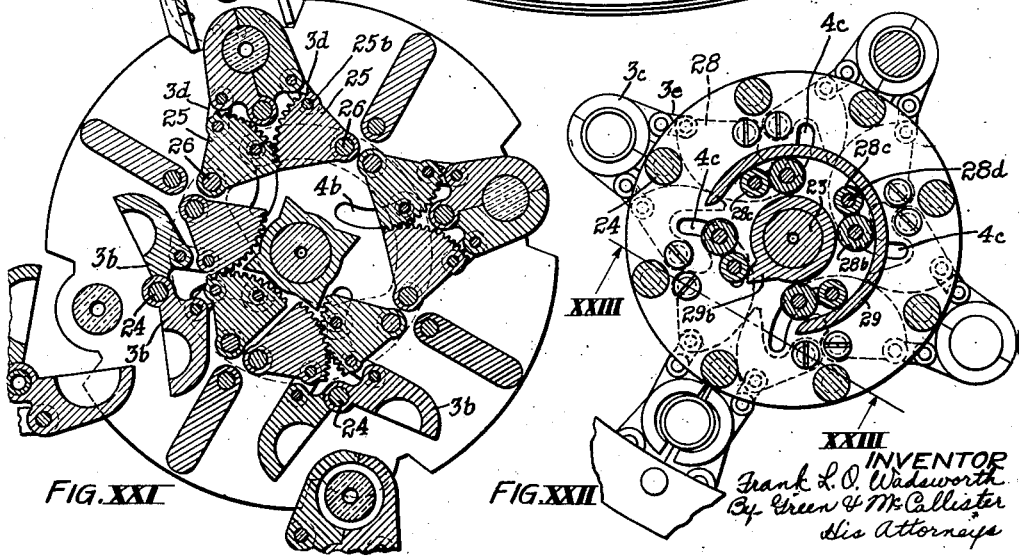

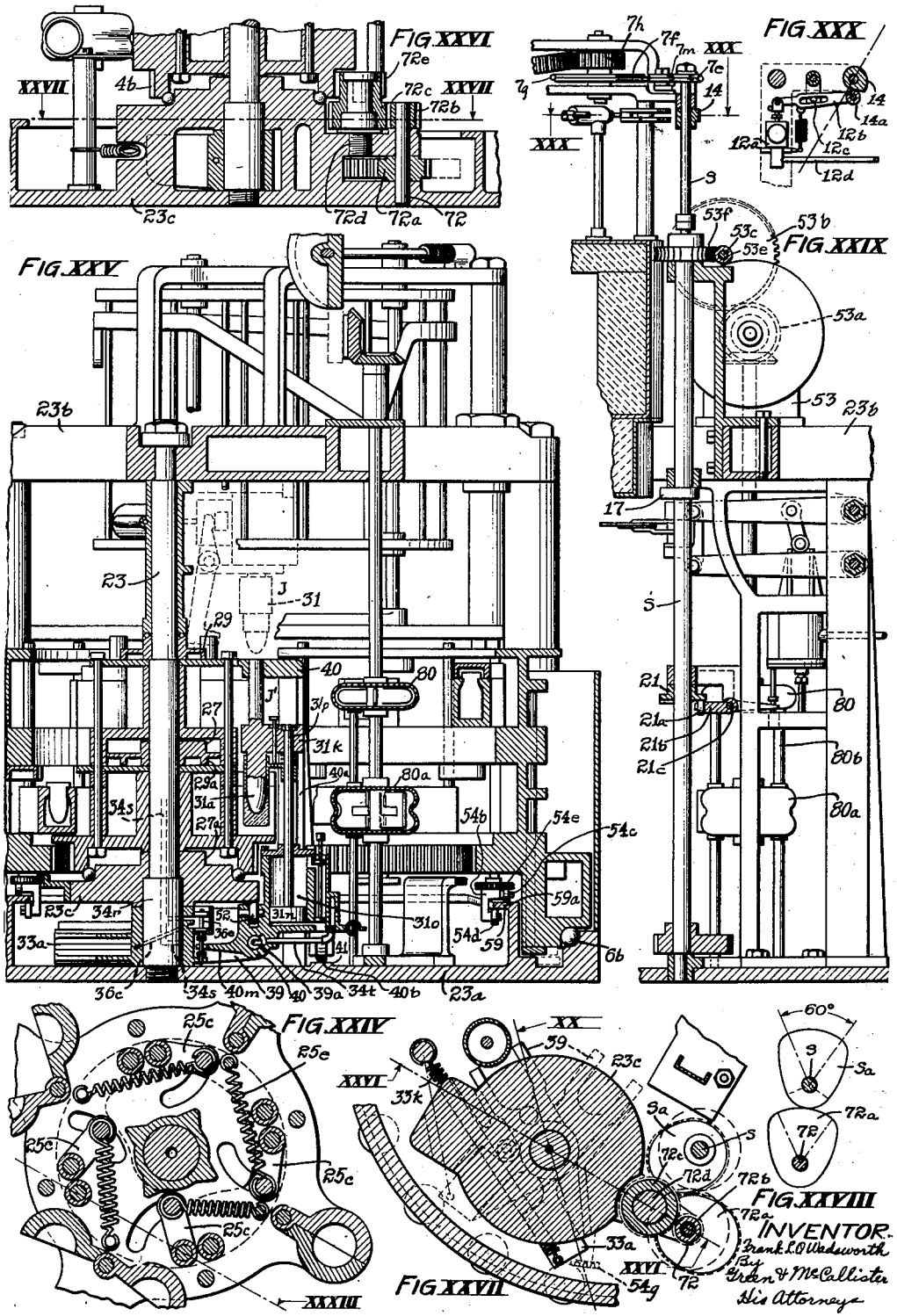

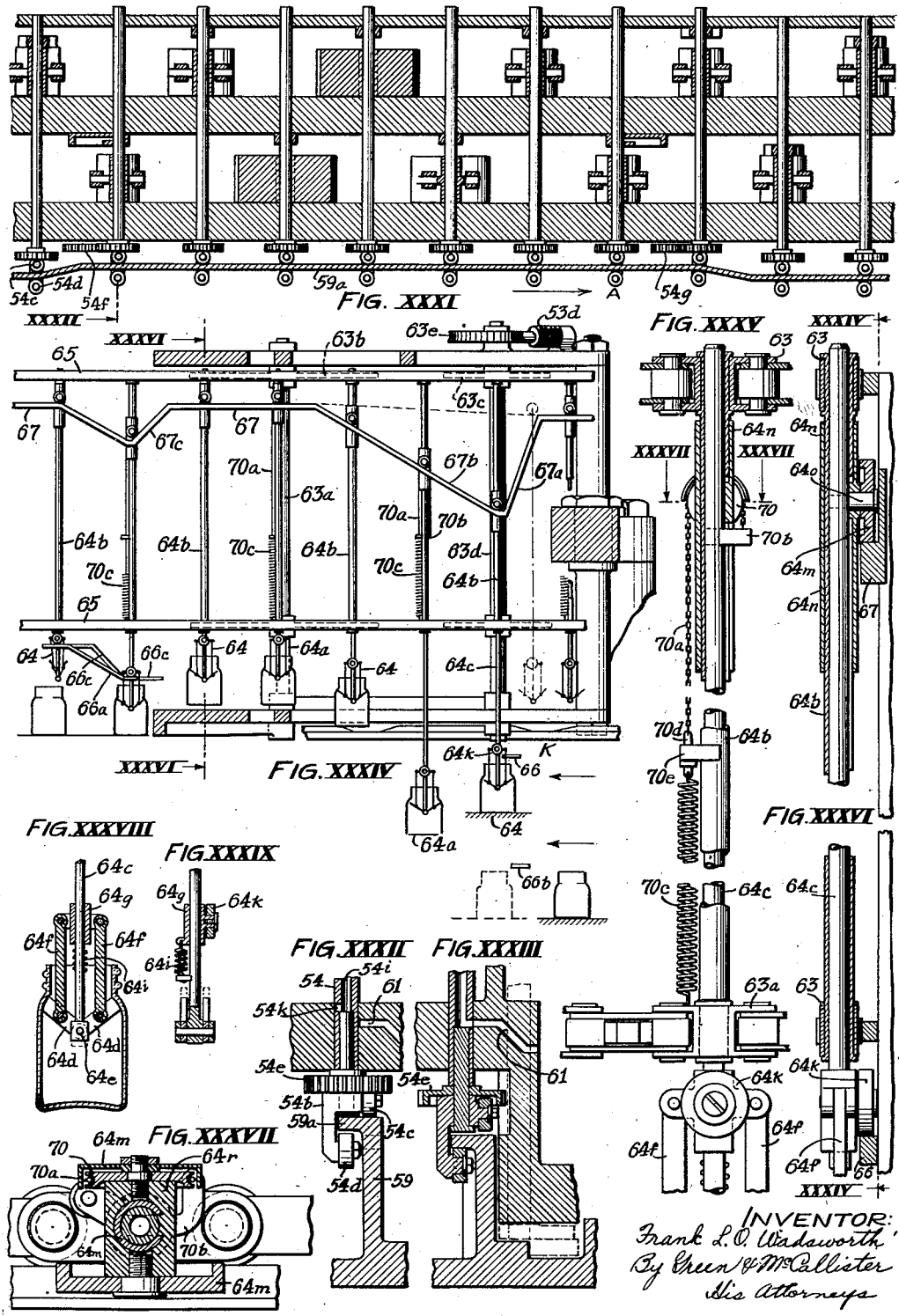

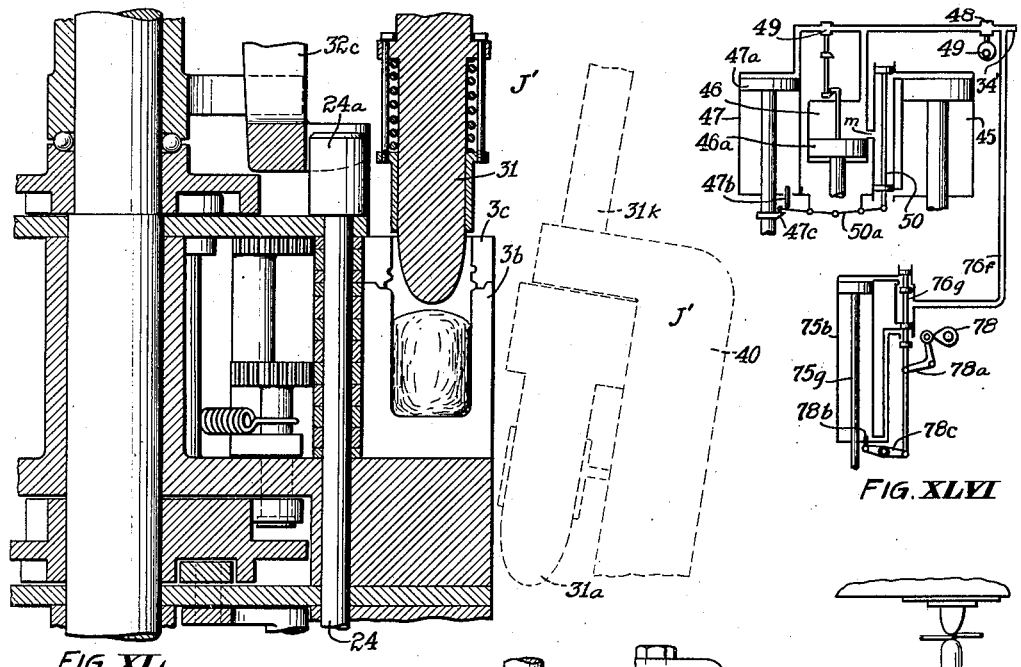

July 19, 1938.  F. L. O. WADSWORTH  2,124,091
APPARATUS FOR THE FABRICATION OF GLASS ARTICLES
Filed Jan. 18, 1935  9 Sheets-Sheet 9
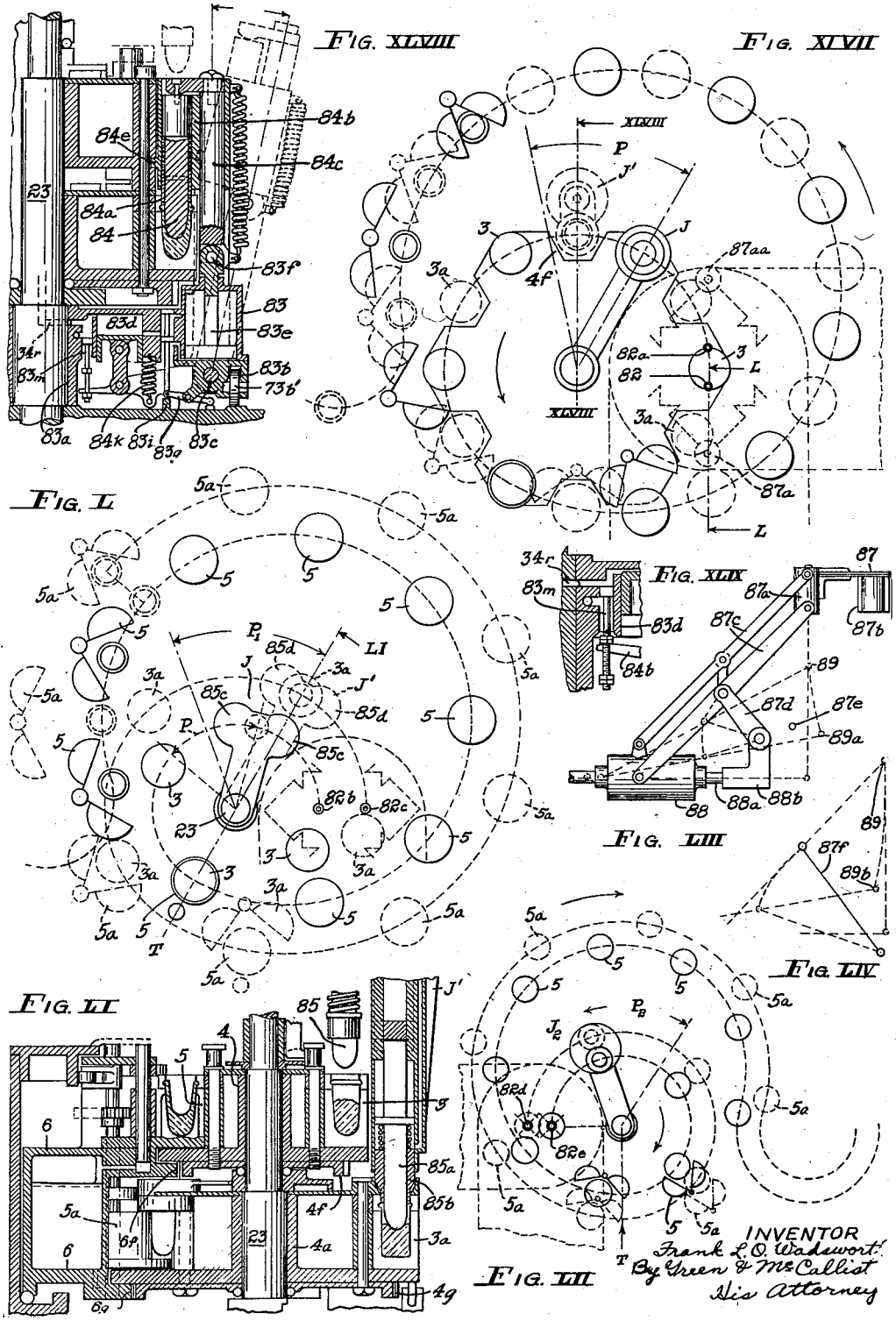
INVENTOR
Frank L. O. Wadsworth
By Green & McCallist
His Attorney Patented July 19, 1938

2,124,091

UNITED STATES PATENT OFFICE 2,124,091

APPARATUS FOR THE FABRICATION OF GLASS ARTICLES

Frank L. O. Wadsworth, Pittsburgh, Pa., assignor to Ball Brothers Company, Muncie, Ind., a corporation of Indiana Application January 18, 1935, Serial No. 2,361

34 Claims. (Cl. 49—9)

This invention relates broadly to the fabrication of glass articles from molten glass and has for an object to produce new and improved procedure and new and improved apparatus for so fabricating such articles.

A further object is to produce procedure and apparatus for fabricating molten glass into the finished articles, such that the number of such articles effectively fabricated in a unit of time is materially increased and the floor space necessary for accomplishing such fabrication is greatly decreased as compared to procedure and apparatus now in use and known to me.

A further object is to produce a new and improved procedure and new and improved means for forming mold charges from a mass of molten glass contained in a furnace or other suitable receptacle and for delivering each formed mold charge to an individual mold of one or more series of molds.

A further object is the production of an improved machine for fabricating glass articles from highly plastic charges of glass delivered from the forehearth of a glass melting tank or similar receptacle, such that the number of such machines employed in connection with such a tank or receptacle may be materially increased as compared to present practice, or such that the output of the melting tank may be materially increased by reason of the more rapid withdrawal therefrom of glass for fabrication purposes.

These and other objects which will be made apparent to those skilled in the art, by the further description, are attained by means of the improved procedure and improved apparatus herein set forth and disclosed in connection with the accompanying drawings, wherein:

Figure I is a general semi-diagrammatic plan view of several units of my improved combination arranged in radial relationship to a round nosed tank furnace;

Fig. II is a general rear elevation of one of these units as viewed on the sectional plane II—II of Fig. I;

Fig. III is a developed diagrammatic elevation of the two rows of parison molds on the press table of the forming machine;

Fig. IV is a plan view of the feeder forehearth and of shear and press mechanisms (other parts of the forming machine being omitted);

Fig. V is a vertical section through the forehearth on the plane V—V of Fig. IV;

Fig. VI is a sectional elevation of the shear mechanism on the plane VI—VI of Fig. IV;

Fig. VII is a horizontal section of the forehearth on the plane VII—VII of Fig. V;

Fig. VIII is another horizontal section on the plane VIII—VIII of Fig. VI;

Fig. IX is a sectional elevation on the plane IX—IX of Figs. VI and VIII;

Fig. X is a horizontal section (on a greatly enlarged scale) on the plane X—X of Fig. IX;

Fig. XI is a general plan view of the double deck forming machine per se;

Fig. XII is a sectional elevation thereof on the plane XII—XII of Fig. XI;

Fig. XIII is an enlarged sectional detail on the plane XIII—XIII of Fig. XII;

Fig. XIV is another enlarged sectional elevation on the plane XIV—XIV of Fig. XII;

Fig. XV is a third enlarged vertical section on the plane XII—XII of Fig. XI;

Fig. XVI is a horizontal section on the plane XVI—XVI of Fig. XII;

Fig. XVII is a composite plan view of the press mold table of the forming mechanism—the lower part of this figure being sectioned on the plane XVII—XVII of Fig. XV, and the upper half being sectioned on the plane XVII$^a$—XVII$^a$ of Figs. XII and XV;

Fig. XVIII is a detail sectional view on the vertical plane XVIII—XVIII of Fig. XVI;

Fig. XIX is another sectional elevation on the plane XIX—XIX of Fig. XVII;

Fig. XX is a partial horizontal section on the plane XX—XX of Figs. XII and XV;

Fig. XXI is another partial section on the horizontal plane XXI of Fig. XII;

Fig. XXII is a second plan view on the plane XVII—XVII of Fig. XV with the press molds in the position shown in Figs. XI and XX (or 45 degrees away from the position shown in Fig. XVII);

Fig. XXIII is a partial sectional elevation on the plane XXIII—XXIII of Fig. XXII (and Fig. XXIV);

Fig. XXIV is a horizontal section on the plane XXIV—XXIV of Figs. XV and XXIII;

Fig. XXV is a sectional elevation on the plane XXV—XXV of Figs. XI and XX;

Fig. XXVI is a partial sectional elevation on the plane XXVI—XXVI of Figs. XI and XX (and Fig. XXVII);

Fig. XXVII is a horizontal section on the plane XXVII—XXVII of Fig. XXVI;

Fig. XXVIII is a diagrammatic view of a detail modification of a part of the construction shown in Fig. XXVII;

Fig. XXIX is an elevation (partly in section), as viewed from the plane XXIX of Figs. VIII and XX;

Fig. XXX is a detail section on the horizontal plane XXX—XXX of Fig. XXIX;

Fig. XXXI is a developed sectional elevation on the cylindrical plane XXXI—XXXI of Fig. XI;

Fig. XXXII is an enlarged sectional detail, on the plane XXXII of Fig. XXXI;

Fig. XXXIII is another detail view on this same plane showing the parts in a different position;

Fig. XXXIV is a developed elevation of a portion of the delivery mechanism adjacent to the curvilinear plane XXXIV—XXXIV of Fig. XI (and Fig. XXXVI), with the subjacent parts projected on the flat plane XXXIV$^a$—XXXIV$^a$ of the same figure;

Fig. XXXV is an enlarged front view (partly in section) of one of the elements of the mechanism shown in Fig. XXXIV;

Fig. XXXVI is a cross section, on the plane XXXVI—XXXVI of Fig. XXXIV, of another element of this mechanism;

Fig. XXXVII is a sectional plan view on the plane XXXVII—XXXVII of Fig. XXXV;

Figs. XXXVIII and XXXIX are transverse sectional views of another portion of the delivery apparatus;

Fig. XL is a detail radial section through one of the upper press molds and its associated plunger at the initiation of the pressing operation, when the parts are in an intermediate position between the planes XII—XII and XL—XL of Figs. I, IV, XVII and XX;

Fig. XLI is a sectional elevation (on the plane XLI—XLI of Fig. XLII) of another form of shear and accelerated delivery mechanism which embodies certain features of my present improvements;

Fig. XLII is a sectional plan view on the plane XLII—XLII of Fig. XLI;

Fig. XLIII is a rear elevation of the mechanism shown in Figs. XLI and XLII;

Fig. XLIV is a diagram of the relative arrangement of the upper and lower press molds when the forming machine is provided with this second form of shear;

Fig. XLV is a partial rear view of another modification of the mechanism shown in Figs. XLI to XLIII inclusive;

Fig. XLVI is a diagrammatic outline of the cylinder and valve elements (with their pipe connections) which are used to operate the pressing and shear assemblies of my feeding and forming apparatus, and illustrates some additions to, and modifications of, the corresponding elements that are shown in the preceding figures;

Fig. XLVII is a diagrammatic plan view of another form of double deck construction, in which glass is supplied to the press molds from a "twin orifice" feeder;

Fig. XLVIII is a partial sectional elevation on the plane XLVIII of Fig. XLVII;

Fig. XLIX is an enlarged section, on this same plane (XLVIII), of one of the valve control elements shown in Fig. XLVIII;

Fig. L is a diagrammatic plan view of another exemplification of my present improvements;

Fig. LI is a partial section on the vertical plane LI—LI of Fig. L;

Fig. LII is still another diagrammatic plan view of a twin orifice feeder, and double deck machine assembly, which embodies the main features of my invention;

Fig. LIII is a general side elevation of an alternative form of shear mechanism which is adapted for use in conjunction with the various forms of mechanism which are presented as illustrative of my improvements;

Fig. LIV is a diagram showing a modification of a portion of the shear mechanism illustrated in Fig. LIII; and Fig. LV is a diagrammatic outline of another arrangement of a "twin" orifice feeder, with either single deck or double deck press and blow tables—(showing only the upper rows of mold units)—which may be used in the practice of my present invention.

The new procedure or method here involved includes accelerating the formation and the delivery of mold charges to individual molds such that each charge is not only formed while in suspension, but is also projected at a high velocity into a moving mold where it is initially processed and from which it is delivered to a second mold while both the receiving and delivering molds are moving in substantially coincident paths and at the same peripheral speed.

Another feature of my improved procedure is that the successive mold charges delivered from a single delivery orifice are, in effect, divided into two series, the successive mold charges of one of which are delivered to successive molds of one set of forming units, whereas the successive charges of the other series are delivered to the successive molds of a second set or series of corresponding units, with the result that during the operation of converting the mold charges into glass articles the charges move through two separate paths but in such relationship that the finished articles may be, and preferably are, delivered to the leers or similar tempering apparatus by the same conveying mechanism. In other words, all the mold charges which are formed and delivered while moving through substantially the same path are divided into two series which travel in separate paths, but the paths of travel of the two series are finally united so that fabricated articles are all delivered along substantially the same path during their passage to the annealing apparatus.

The apparatus herein set forth is adapted to carry forward the procedure above generally defined and includes a new and improved feeder equipped with new and improved means for severing separate mold charges from a flowing stream and for projecting each such charge at a high velocity along a predetermined path which terminates in a moving mold.

The moving molds which thus initially receive the mold charges are arranged in two banks or series, both of which may be and preferably are, carried by a single table which revolves about a fixed center and is so associated with processing apparatus, such as a press plunger, that the initial operations of receiving the charges and of converting them into partially finished blanks, are accomplished while the table is continuously moving.

Another characterizing feature of my improved apparatus is that sections of the molds—viz., the neck ring sections—carried by the press table move for an appreciable period along a path which is substantially coincident with a portion of the path of travel of the molds carried by the finishing table, thus giving the opportunity of transferring the blanks from the molds of the press table to the molds of the finishing table while both tables are moving, and in this way simplifying and facilitating the blank transferring operation and eliminating the danger and possibility of distorting or otherwise marring the blank during such transfer. This is accomplished, in the illustrated embodiment, by providing a finishing mold table of annular form, and so mounting the table that it surrounds the press table and is, in effect, tangent thereto; and then so correlating the speed of rotation of the two tables that the centers of each neck ring section forming a part of each press mold assembly, is moving—at the time of transfer—at the same circumferential speed as the center of the finishing mold which cooperates therewith in accomplishing the transfer of the blank.

For the purpose of giving a general idea of my invention and the apparatus constituting a part thereof, I first refer to Figs. I—III of the drawings wherein the apparatus is diagrammatically illustrated. A suitable feeder mechanism is mounted in a forehearth extension F of a furnace or melting tank G and, as indicated in Fig. I, several such forehearths and feeders may be employed in connection with a single melting tank. Each feeder is provided with a submerged flow orifice 2, and is so operated that molten glass issues from said orifice in the form of a continuously flowing stream of predetermined variable cross section and is severed into mold charges of the desired form and weight by means of a shear mechanism H. One exemplary form of feeder and shear mechanism is best shown in Figs. IV-X inclusive.

The combined feeder and shear mechanism is adapted to alternately deliver successively formed glass charges to the successive units of the two series or banks of molds 3 and 3a, carried by a continuously rotating press table 4; and as diagrammatically illustrated in Fig. III, the molds 3 are located on an upper mold carrying deck of said table, whereas the molds 3a are located on a lower mold carrying deck. The series of successive mold charges delivered by the feeder apparatus are therefore, in effect, divided into two groups, one of which is received by the upper and the other of which is received by the lower molds of this double deck table.

Inasmuch as each mold 3 or 3a is moving at the time of receiving a mold charge, I not only prefer to project each mold charge downwardly at a high velocity, but I also prefer to so control this action that the mold charges are moved laterally as well as downwardly, with the result that, at the instant of entering the mold, a component of the projected motion of each charge is substantially in line with the direction in which the mold is traveling;—all as diagrammatically illustrated in the dotted and full line representations in Fig. III of a downwardly moving mold charge. For this reason, this shear mechanism H is so arranged that at the moment of severing a charge from the flowing stream it lightly embraces the severed charge and is then moved downwardly at a speed materially in excess of that of the flowing stream and also substantially in excess of that of a freely falling body, and is thereby delivered to the receiving receptacle at a velocity which is much greater than it would acquire under the action of gravity alone.

During this accelerated downward movement the charge embracing shear elements are preferably moved laterally in the direction in which the receiving receptacle is traveling; and the rate of lateral displacement of the directed charge is preferably substantially equal to the circumferential speed of mold movement at the time when the charge enters the mold.

The arrangement of the two series or banks of molds 3 and 3a, on the press table 4, is also such that molds 3 and 3a will alternately arrive at the charge receiving position designated in Figs. I and III by B and also by the legend "charging position". In other words, the lower molds are located in staggered relation with the upper molds, and the arrangement is such as to provide an unobstructed path of travel for the mold charges entering a lower mold when such a mold is in a charge receiving position.

I will first describe the operation generally, and only in connection with the upper molds 3, it being understood that all the molds on the table 4 are moving in unison in the direction indicated by the horizontal arrows associated with Fig. III. When each receiving (press) mold 3 arrives at the position A—also designated by the legend "transfer point"—the body sections thereof are open and the closed neck ring sections are then separated to aid in the transfer of the suspended pressed parison or blank to a cooperating mold 5, carried by the annular finishing table 6. The empty opened mold 3 leaves the position A, and after it moves out of the path of the then closed blow mold 5 it is again closed in readiness to receive another charge when it arrives at the position B. As the mold passes the position B, a mold charge, which is moving downwardly along an inclined path as previously described, is projected into it at a high velocity, and by reason of its impact with the bottom of the closed receptacle is upset and "mushroomed" out to completely fill the lower part of the mold cavity (see position C, Fig. III).

The primary function of the molds 3 and 3a (when employed as a part of the apparatus here illustrated) is to form the charges into pressed blanks or "parisons"; and this is accomplished by means of a press plunger mechanism J, (Figs. XII and XXV), which is moved into and out of registry with the successive molds containing the blank charges, while these molds are traveling through the arc designated by the term "press interval" in Fig. III, or by the term "pressing" in the left-hand portion of Fig. I, or by the legend "arc of pressing" in Fig. IV.

In order to avoid unnecessary duplication and complication of apparatus, it is desirable to employ but one press plunger mechanism with each bank of molds carried by the press table 4, and inasmuch as this table is continuously revolving during the operation of the apparatus, the press plunger must not only move forwardly with a mold, during each pressing operation, but it must also move back to a position such that it can cooperate with the next successive mold of the bank or series as that mold arrives at the beginning of the pressing arc (i. e., the position indicated at C in Figs. I and III). To accomplish this, I have so arranged the press plunger mechanisms that they are oscillated about the center of rotation of the table 4;—first moving with the table during the pressing operation and then moving in the reverse direction to return the pressing plunger to its initial position to cooperate with the next successive mold of the series.

This entire forward and reverse movement of the press assembly necessarily takes place while a mold 3 is moving from the position C to the position D. During the first movement of the press mechanism—i. e., the movement with the table—I insure proper relative positioning of the press plunger and its then associated mold, by locking the plunger actuating mechanism to the table. After the pressing operation is completed and the plunger is withdrawn from the mold, the press mechanism is unlocked from the table and is permitted to swing back to its initial position in response to the pull of a return spring.

It will be apparent that the travel of the press plunger actuating mechanism must be somewhat greater than that actually involved by the actual pressing of the blank charge, because of the time required to lower and raise the pressing plunger. It will also be apparent that the arc through which the press mechanism travels during the period initiated by the locking of the mechanism to the table and completed by the return of that mechanism to its initial position after the pressing operation is completed, is somewhat greater than the so called pressing arc, and I have indicated this in Fig. I by the arc subtended by the word "return", and in Fig. IV by the legend "arc of return". In other words, this last mentioned arc indicates the angular distance through which the press table travels from the time the press plunger assembly is being locked thereto until that assembly is unlocked therefrom preparatory to its return to its initial position, and this arc must necessarily be less than the arc between the adjacent mold units of one bank or series carried by the table.

The several successive steps which take place during one complete cycle of movement, or one complete revolution of the press table may be described (in connection with the diagrammatic illustrations of Figs. I and III), as follows: Viz. (1), the charge receiving step (at position B); (2), the interlocking of the press assembly to the press mold table (at position C); (3), the pressing of the parison blank (between positions C and D); (4), the unlocking of the press plunger assembly and its return to its initial position (C); (5), the opening of the body sections of the press molds (between positions D and A); (6), the transfer of the blank, formed by the pressing operation, to a cooperating mold of the finishing table, by concurrently opening the neck ring sections of the press mold and closing the section of the finishing mold (at position A); and (7), the closing of all the sections of the press mold unit preparatory to receiving another charge.

As before stated, the press molds 3a carried by the lower deck of the press table are in staggered relation with those of the upper deck, consequently the cycle of operation in connection with any one of the molds 3a will be the same as the cycle of operation above described;—the only substantial difference being that the press plunger mechanism J1, which cooperates with the lower bank or series of molds, must be tilted out of the path of travel of the upper bank of molds, as shown in dotted lines in Fig. XL, so as to permit its return to its initial position, after the pressing operation is completed.

The blow mold table 6 is also a double deck table and each deck carries a series or bank of blow molds (5 and 5a) which cooperate with the correspondingly located press molds of the table 4. The press and finishing tables are geared together, preferably at the point of tangency previously mentioned; and consequently the centers of the molds of both tables move at the same peripheral speed. It is therefore apparent that the blow molds carried by the finishing table are not only positioned on the same levels as the press molds, but have the same circumferential spacing as those molds, with the result that the molds 3a—5a of the lower deck are located in staggered relationship with the molds 3—5 of the upper deck. In the apparatus illustrated, each deck of the press table carries four molds and each deck of the finishing table carries ten molds, but it will be understood that the number of molds carried by each table may be varied, within wide limits, by varying the relative sizes of the two tables (e. g. see Figs. XLVII to LV).

As will be more fully described hereinafter, the blow molds 5—5a may be, and preferably are, of the split mold type and each such mold is provided with an individual blow head, which is moved out of operative position with relation to its mold, and is held in that position during the article delivering operation and the blank transferring operation and is then moved back to its operative position for the purpose of blowing the newly transferred blank.

In Fig. XX the relative positions of the press and finishing mold sections at the instant of blank transfer is shown, and starting with that operation it is apparent that the cycle, as it involves any one finishing mold, includes receiving and enclosing a pressed blank within the mold cavity while the blow head is in the withdrawn or inoperative position; moving the blow head to the operative position to cover the neck of the transferred blank; subjecting the interior of the blank thus enclosed to the action of compressed air delivered by the blow head for the purpose of blowing it out to fill the finishing mold; moving the blow head to the withdrawn or inoperative position; opening the mold sections to permit of the removal of the blown article; and then closing the mold around a blank supported by the neck ring section of a press mold assembly to repeat the cycle.

In my improved apparatus this cycle of operation is modified in that each blown article is engaged by an element of an article delivery mechanism K after the blow head has moved off of the mold and subsequent to the initial opening of the blow mold sections, so that when these sections are fully opened, the removal and the placing of the finished article on the lehr conveyor is directly under the control of the delivery mechanism K.

Feeder structure

The feeder forming a part of the present invention is so constructed and arranged that the molten material is delivered by it in the form of a continuously flowing stream which is periodically severed to form separate mold charges. The molten glass forming the stream is forced through a submerged flow orifice 2 under the combined effect of an appreciable gravity head and a continuously acting pressure pump, and the cross sectional area of this stream is periodically increased,—i. e., between severing operations—by subjecting the glass immediately above the flow orifice to additional expelling pressure, i. e., to pneumatic pressure applied to the surface of that glass.

As before stated, the stream is severed into mold charges by a shear mechanism H, which is equipped with quick acting shears and is preferably so arranged that immediately subsequent to each severance the shears not only move downwardly at a speed greater than the rate of glass flow within the stream, but also at a speed greater than the velocity of drop under the action of gravity; and in addition to this, are further moved laterally so that each mold charge severed by the shear mechanism is projected at a high velocity in a downwardly inclined direction with the lateral component of its motion substantially in the direction in which the mold receiving the charge is traveling at the time of reception.

Referring specifically to Figs. V to X, the feeder mechanism includes a forehearth chamber 1, which is enclosed by refractory material and which is provided with a glass delivery orifice 2—positioned at the lower end of a sub-forehearth sleeve 1a. The sleeve, together with a refractory bell 1b, encloses an accumulation or segregation chamber 2a, the inlet port 2b of which is located well above the orifice 2, but below the surface of the glass contained within the main forehearth chamber 1. Molten glass is continuously forced into the accumulation chamber through the port 2b by means of a rotatable pump which includes a continuously rotating refractory impeller 7, shown in the form of an Archimedes' screw, which projects downwardly at a slight angle through the roof of the chamber 1 and below the surface of the glass contained in that chamber.

The impeller 7 is detachably secured to the lower end of a metal sleeve 7a, which is rotatably mounted on a central journal pin 7b, that is provided with a conical end projecting into a thin metal liner 7c embedded in the refractory impeller 7. A gear 7d is splined or otherwise secured to the rotatable sleeve and is driven from the main drive shaft S of the machine through the agency of pulleys 7e, 7f, a belt 7g and a gear 7h.

The rotating parts immediately associated with the impeller 7 are elastically supported by a spring 8 interposed between a collar 7i formed on the sleeve 7a and a stationary ball bearing 8a, which encircles the lower end of the sleeve and is supported between the downwardly extending forks 9a of the head frame 9. The upper end of the journal pin 7b is provided with an enlarged head 7k, which is screw threaded into a tapped aperture provided in the head frame 9 and which is provided at its extreme upper end with a squared extension for engagement by a wrench. The head 7k provides a shoulder against which the sleeve 7a is pressed by the spring 8, consequently the impeller 7 may be raised or lowered with relation to the glass level in the chamber 1 by adjusting the vertical position of the journal pin 7b through the agency of its screw connection to the head frame.

The screw threaded end of the impeller is enclosed within a pump chamber formed within a refractory floor block 10. A stationary sleeve 11 mounted in the roof aperture through which the impeller projects, surrounds the impeller and extends downwardly below the surface of the molten glass within the chamber 1, thus performing the double function of sealing the roof aperture against the escape of burned gases and of also completing the pump chamber enclosure in which the threaded portion of the impeller 7 is located.

Air under pressure is delivered to the interior of the bell 1b through a pipe 12 and a cam controlled valve 12a so as to periodically subject the glass in the segregation chamber 2a to a controllable air pressure, so timed that the glass above the delivery orifice 2 is subjected to an increased air pressure at periods intermediate the severing operations of the shear mechanism H. In this way the flowing stream is periodically expanded or swelled during the operation of forming each individual mold charge.

The operating cam 14 for the air valve 12a is most clearly shown in Figs. XXIX and XXX, and as there illustrated is mounted on the extension of the shaft S which carries the pulley 7e. The valve 12a is actuated by the cam 14 through the agency of a lever 12b which is rockably mounted on an adjustable fulcrum pin 12c and is spring restrained, so that a cam roller 14a carried by it is continuously pressed against the face of the cam 14. With this arrangement the extent of valve opening may be varied, and consequently the degree of air pressure admitted to the chamber 2a can be controlled;—it being understood that any suitable means for adjusting the position of the fulcrum 12c may be employed and that the pipe connection 12 is provided with a small leakage port which functions to reduce the pressure within the bell when the valve is closed, but which is of such small area that the leakage through it, while the valve is fully open, will not appreciably reduce the air pressure delivered to the bell below that at the source of the compressed air. The high pressure air is delivered to the casing of the valve 12a through a pipe 12d which leads to any suitable source of air under pressure such as a tank.

From the foregoing it will be apparent that the expulsion pressure on the glass above the orifice 2 is dependent upon (1) the depth of the glass in the accumulation chamber 2b; (2) the pressure of the air above the glass in that chamber; (3) the speed of rotation of the impeller 7; and (4) the position of that impeller relative to the port 2b; and that the last three of these agencies may be independently adjusted by the machine tender. For example, the air pressure admitted through the valve 12a may be adjusted by varying the position of the fulcrum 12c longitudinally of the lever 12b; the position of the screw impeller 7 with relation to the port 2b may be varied by adjusting the longitudinal position of the journal pin 7c; and the speed or rotation of the impeller may be changed by changing the size of the pulley 7e; and that the two first mentioned adjustments may be readily made while the feeder is operating. In order to provide for the last mentioned adjustment, the belt 7g is provided with a spring pressed idler pulley 7m which functions to take up the slack of the belt and thus accommodate the belt to different size pulleys.

The usual means, such as gas or oil burners are employed for keeping the glass in the chamber 1 at the proper temperature. In addition, I have provided a heating chamber 1c which surrounds the sleeve 1a and which communicates with a gas discharge passage 1d which extends upwardly beyond the level of the glass contained within the forehearth chamber 1. One or more burners 1e, 1e play into the chamber 1c and the burned gases are vented into the melting tank through the passage 1d and an aperture 1f formed in the gate valve 1g.

The gate 1g extends through the roof of the chamber 1 and is so mounted that it may be raised and lowered to control the flow of glass from the furnace to the chamber 1 and even shut off that flow when the feeder is not in operation. This gate valve also performs the function of a skimmer block, since in its fully open position, its lower end projects below the surface of the glass and thus prevents surface impurities from entering the chamber 1.

Shear mechanism

The shear mechanism H (Figs. VII–X and XXIX) is equipped with a pair of quick acting shear blades 15, preferably of the cat's eye type and so located that they sever the stream issuing from the orifice 2 immediately below that orifice. The blades are mounted on a swinging head 16, which in turn is supported by parallel links 16a—16a, pivotally secured to a suitable bracket constituting a part of the machine frame and also pivotally secured to the head 16. Each shear blade is secured to an arm 15a which is rotatably supported on shaft 15b that is journaled in the arms or prongs of the U-shaped head 16; and each arm 15a is provided with a gear sector which meshes with an intermediate bevel gear 16b journaled on a suitable stub shaft carried by the head 16. One of the arms 15a is keyed to the shaft 15b, and this shaft is also provided with a shear closing cam finger 15c rigidly secured thereto.

The head 16 is adapted to swing from the position shown in dotted lines in Fig. VI to the position shown in full lines in that figure, while and after the shears are being moved from their uppermost open position shown in Fig. VIII, (and in dotted lines of Fig. VI), to the full line position of the last mentioned figure; and the cam finger 15c is so located on the shaft 15b that when the head and the associated parts are located in the uppermost position (dotted line position), the finger is adapted to be engaged by a cam 17 mounted on the main shaft S (Figs. X and XXIX). The cam 17 is so formed, and the relationship between it and the finger 15c is such, as to gradually accelerate the closing movement of the shear blades 15—15 and to complete this closing movement or the severance of the flowing stream while the blades are moving at their maximum closing velocity. In order to facilitate the relative movements of the cooperating elements during the final acceleration period of stream severance, the outer end of the cam lobe may be provided with a cam roller 17a.

The angular position of the cam 17 on the shaft S is so adjusted that the shears are closed during the intervals of reduced air pressure in the bell chamber 2a, so that the severance of the stream is accomplished at sections of the stream of minimum cross-sectional area. The final closing of the shears is accomplished or accelerated by a snap spring 15d, hereinafter more fully described.

In order to prevent any checking of the flow through the orifice 2 at the time of severance, the blades are adapted to move downwardly not only after the severance is completed, but also during their passage into and through the stream of flowing glass; and at this time they preferably move downwardly at a speed which is at least equal to that of this stream, but which is less than the accelerated speed of the shear blade closing movement. This downward is effected by connecting the parallel links 16a to a pneumatically operated piston 18 which is mounted in a cylinder 18a that is carried by the machine frame. The piston 18 is operatively connected to the links 16a by means of the piston rod 18b and the links 18c.

The delivery of actuating fluid to the cylinder 18a is controlled by a double piston valve 20 which is so arranged, with relation to its casing and the ports formed therein, that when the valve is in its uppermost position—as shown in Fig. VI—fluid under pressure is admitted to the cylinder above the piston 18b and the portion of the cylinder below the piston is open to the atmosphere. An inspection of the illustration forming a part of Fig. VI will also disclose that when the valve 20 is in its lowermost position, fluid under pressure is admitted to the cylinder below the piston, whereas the portion of the cylinder above the piston is then open to the atmosphere. By this arrangement, reciprocations of the valve 20 control the reciprocations of the piston 18 and thus control and time the swing of the shear carrying head 16. Air under pressure is preferably employed as the motive fluid delivered to the cylinder 18a and is received by the casing of the valve 20 through a pipe 20a and associated passages and ports.

The valve 20 is actuated by means of face cam 21 mounted on the shaft S, and a cooperating cam lever assembly, which comprises a cam roller 21a carried by the arm 21b, a cross shaft 21c to which the arm 21b is secured, and a second arm 21d which is keyed to the shaft 21c and is provided with a bifurcated end which embraces a downwardly projecting portion of the stem 20b of the valve 20, and a coil spring 21e which acts on the arm 21d and yieldingly presses the roller 21a against that surface of the face cam 21. The cam controlled movement of the lever assembly 21b—21c, etc., is imparted to the valve 20 by means of a lost-motion connection which, as illustrated, is provided by threading nuts 20c—20c onto the stem 20b so that they are located on opposite sides of the bifurcated end of the arm 21d. With this arrangement, the extent of the lost motion may be adjusted, and the time of operation of the piston 18 may be varied slightly by adjusting the position of one or both the nuts 20c, and without changing the adjustment or the positioning of the cam 21 on the shaft S.

From the foregoing it will be apparent that the downward movement of the shears may be, and preferably is, initiated prior to the time that the severance of the stream, by the blades 15, is completed, and that the shears then continue their downward movement after the blades have completed their cutting movement at a greatly accelerated velocity. In order to maintain control of the severed mold charge, the shear blades 15 are provided with downwardly projecting semi-cylindrical guard sleeves 15e, each of which is so located on its supporting blade that when the blades are in the closed position the two guards cooperate to form an open bottom cylindrical receptacle which envelopes the severed charge as illustrated in Fig. VI.

When the shear head 16 arrives at its lowermost position, the shear blades are opened, and the severed mold charge is thus released from its engagement with the sleeve guards 15e, and continues its downward movement along the direction imposed on it by the downwardly swinging blades. In other words, the charge is projected along a line tangent to the end of the arcuate downward movement of the shear blades, and consequently the blades, together with their carrying guards 15e, are preferably opened, or at least partially opened, prior to the completion of the downward swing of the shear head. This opening of the blades is accomplished by a stationary wedge-shaped blade or cam 22, which is adjustably mounted on the machine frame, as shown in Figs. VI and IX, and is so located that its inclined face engages a finger 15f, carried by the lower shear arm 15a. The snap spring 15d first resists and then completes the opening of the shears.

As illustrated the spring 15d (Fig. VIII), is a coiled compression spring pivotally secured to one arm 15a and also to the head 16, and so positioned with relation to the arm and head that it functions to resist both the closing and the opening movement of the shear blades until its points of pivotal connection with the arm 15a and the head 16 have passed the "dead center" line, whereupon the spring functions not only to accelerate the closing and opening movements, but also to hold the shear blades fully opened or fully closed.

The movement of the shear head piston 18 may be limited and adjusted by means of stop nuts located on a downwardly projecting extension 18d of the piston rod 18b, which projects through a suitable aperture formed in a bracket of the machine frame. The upward movement of the shear head 16 may also be cushioned by a spring 16c carried by the machine frame and arranged to engage at least one of the arms 16a as the shear head moves upwardly.

It will be noted that the shear opening blade or cam 22 is provided with a screw threaded shank 22a, and is held in place by clamping nuts 22b which engage either side of a suitable bracket 22c secured to the machine frame; and that therefore the time of shear opening, with relation to the downward swing of the shears, may be adjusted throughout a relatively wide range, and that this adjustment may be accomplished while the shear mechanism is in operation.

The operation of the shear mechanism is as follows: As the shear head 16 swings upwardly, the blades 15 are open, therefore, their upward movement does not in any way interfere with the charge forming operation which is taking place below the orifice 2. After the issuing stream of molten glass is swelled by the application of air pressure to the interior of the bell 1b, the cam 17 comes into engagement with the finger 15c and initiates the shear closing movement which is completed by the combined action of the cam and finger and the double acting snap spring 15d. During the shear closing operation, and just before the shear blades are in actual cutting engagement with the depending stream of glass issuing from the orifice 2, the downward movement of the head 16 is initiated by the cam actuated valve 20, which is shifted to the position shown in Fig. VI, thus admitting compressed air to the top of the cylinder 18a and causing the piston 18 to move downward. In this way the shear cut is completed while the blades are moving axially with the flowing stream—thus preventing any "piling up" of the molten material therein—and the downward motion is continued, at a rapidly accelerated rate after a mold charge is severed and is ready for delivery to a press or parison mold.

As already explained, the movement of the shear head assembly is a combined downward and lateral travel; or in other words, is an arcuate movement defined and controlled by the parallel linkage 16a, 16a, during which the moving parts—including the severed mold charge—all travel in parallel relationship. As the head 16 nears the end of its downward swing, the finger 15f engages the stationary blade cam 22, thus opening the shear blades 15 as the head completes its downward movement. It should be understood that the snap spring 15d is preferably so arranged that it will complete this opening movement, although the positioning and adjustment of the cam blade 22 may be such that the cam in and of itself will complete the shear opening operation.

As the head reaches the lower end of its swing, the face cam 21, acting through the lever assembly 21b—21d, etc. shifts the position of the valve 20 to admit motive fluid below the piston 18, thus causing it to move the head 16 upwardly until it is stopped by the spring 16c, and such piston throw limiting means as may be provided for the piston 18. Air under pressure is maintained in the portion of the cylinder 18a below the piston until the valve 20 is again actuated by the cam 21 and the associated mechanism; but in the meantime, the cam 17 again acts to initiate the closing movement of the shear blades and the cycle of operation is then repeated.

*Blank forming mechanism*

The double deck press table 4 is adapted to rotate about a stationary column shaft 23 which extends vertically from the bed plate 23a to the upper cross beams 23b of the machine frame. The molds carried by each deck or platform of this table may be of usual form,—i. e., such as are ordinarily employed in connection with the formation of so called parisons or blanks—and as here illustrated, each consists of a pair of body mold sections 3b, and a cooperating pair of neck ring sections 3c all of which are pivotally supported on a common pintle bolt 24, that extends from the bottom floor or platform to the top plate of the double deck table 4 (Figs. XV, XVII, XX, XXI, XXII, and XL).

Each pair of body mold sections 3b—3b is operatively coupled, by the toggle links 3d to a pair of intermeshed gear sectors 25, which are rotatably mounted on the vertical shaft supports 26—26 that extend only from the bottom platform to the top plate of each deck. One gear sector of each pair is provided with a downwardly extending stub pin 25b, which is also engaged with a laterally projecting arm 25c at the lower end of the elongated sleeve hub of that gear, and which projects through an arcuate slot 4b formed in the lower platform of the supporting deck. This projecting portion of the stub pin carries a cam roller 25d, which is held against a stationary cam 27 (or 27a), that is mounted on the column shaft 23, by means of a coiled spring 25e (Figs. XII, XV, XXI, XXIII, XXIV, and XXV); and the arrangement and form of the cam 27 is such that it not only operates to close the mold sections, in opposition to the pull of the spring 25e, but also locks those sections in the closed position throughout approximately 180° of their angular motion around the column 23.

The construction and operation of each pair of neck ring sections 3c are similar in many respects to the cooperating pair of body sections 3b. Each pair of neck sections are operatively coupled by toggle links 3e—3e to a pair of interconnected gear sectors 28—28, which are rotatably mounted on the same vertical shaft supports 26—26 that carry the gear sectors 25—25. One of each pair of these gear sectors carries two cam rollers 28b—28c, which are mounted on stub pins 28d that project upwardly through arcuate slots 4c formed in a top plate of the supporting deck; and which are adapted to engage a stationary cam 29 which is so constructed that it not only actuates the sector gears 28 to close the neck ring sections, but also to retain them in the closed and locked position for nearly 270° of their angular travel around the table supporting column 23. This cam 29 is provided with an inner member 29b, which is so positioned with respect to the smaller of the cam rollers (28c) that it operates to break the toggle lock and rotate the sector gears 28 and to open the connected neck-ring sections at the time of transferring a pressed parison to a blow mold.

After the transfer of a parison has been accomplished, the neck ring sections 3c—3c continue to open while the now closed blow mold sections are carried forward by the concurrent rotation of the blow mold table 6; and this relative movement continues until the moving parts reach such a position that the closed blow mold is removed from the path of travel of the body sections of the corresponding press mold, after which these body sections begin to close under the action of the cam 27 (Figs. XXI and XXIV), and carry with them the cooperating neck ring sections;—thus moving all parts of the press mold to the closed position ready for the reception of the next charge of molten glass. It will thus be apparent that the closing and locking of the body sections accomplishes a concurrent locking of the neck ring sections, although the latter operation is further aided by the cooperative action of the outer annular ring element of the cam 29.

The operating mechanisms for the mold sections supported on the lower deck of the table 10 are substantially as just described except that the cam 27a (Figs. XII and XXV) actuates the body mold sections of the molds 3a and the cam 29a, (which is integral with the cam 27), actuates the neck ring sections of those molds.

It will be understood that the cams 27—29, 27a and 29a are so positioned that as each press mold arrives at the charging position (A), its separate sections are not only closed but are locked in the closed position. As previously stated, the timing of the feeder and the shear mechanism is such that as each press mold arrives at this charging position it receives a mold charge. As shown in Fig. I, the next operation, in connection with each individual press mold is the locking of the press plunger mechanism to the table and in a position such that it cooperates with the individual press mold in question.

Press mold assembly

The operation of pressing each mold charge contained within a press mold is similar in many respects to that operation as accomplished by machines such as are now in use. That is to say, it is accomplished by means of a plunger which is moved downward through the open mouth of the closed mold into such a position as to shape the charge of glass therein to the desired form of parison blank, the upper end of which is defined and formed by the joint action of the neck ring sections and the spring pressed "follower" ring that is mounted on and carried by the press plunger. After this shaping is accomplished, the plunger is withdrawn from the mold.

In order to accommodate this procedure to the continuous movement of the press table 4, and at the same time employ a single press plunger in connection with all of the molds mounted on one deck of the table, it is necessary to so mount the press plunger that it will periodically move with the table, while the pressing operation is in progress and then return to its initial position preliminary to repeating the cycle in connection with the succeeding mold of the same bank. To insure the proper positioning of the press plunger during each pressing operation, it is also desirable to lock the press plunger assembly to the table as a preliminary to each pressing operation.

In the apparatus herein illustrated there is one press plunger 31 (Figs. XII and XXV), which cooperates with the mold units (A—B—C—D) carried on the upper deck of the table 4 and corresponding plunger 31a (Fig. XXV), which cooperates with the mold assemblies (A—B—C—D) on the lower platform of this table. The operating mechanism of the upper plunger will first be described.

As shown, the plunger element 31 forms the lower end of a piston rod 31b, the actuating piston 31c of which is located within a cylinder 31d. The entire press plunger assembly, for the upper row of press molds 3, is carried by a frame J which is mounted to oscillate around the column shaft 23. In addition to the plunger 31 and its actuating mechanisms, the press assembly includes a lock actuating cylinder 32 and associated mechanisms, and an auxiliary power cylinder 33 and associated mechanisms.

The lock actuating cylinder 32 surrounds and slides on a solid piston 32b, which is rigidly secured to the frame J, and is moved axially with relation to this piston, to actuate a lock arm 32c fulcrumed on the frame J and adapted to be successively moved into and out of locking engagement with the heads 24a of the pintle bolt supports for the upper bank of press molds 3—3, etc. As here shown, the cylinder impelled movement of the arm 32c is resisted by a coil spring 32d, which is of sufficient strength to hold the arm in the retracted position, or out of the path of travel of the heads 24a, except when the arm is actuated by the admission of motive fluid to the cylinder 32.

As shown in Fig. XVI, the upper end of the arm 32c is bifurcated and engages lugs 32e formed on diametrically opposite sides of the cylinder 32; and as shown in Figs. XVI, XVII, and XL, the lower end of the arm is also bifurcated and is so shaped that the back of its forked opening fits snugly around the heads 24a and ensures a definite and correct registration between the axis of the press plunger and the axis of the subjacent mold, when the arm 32c is moved into locking position, while the outer portion of this opening is flared sufficiently to insure engagement between the parts 32c and 24a at the initiation of the locking movement.

From the foregoing it will be apparent that the preliminary operation of locking the oscillating frame J to the table 4, involves moving the lower end of the arm 32c to a position such that it will at first touch and finally effect a locking engagement with the oncoming bolt head 24a; and that this is accomplished by admitting motive fluid to the cylinder 32. When this operation is completed the upper press assembly will be locked to and carried forward with the revolving table with the axis of the plunger 31 in alignment with one of the press molds 3; but in order to relieve the table drive mechanism from the work of moving the press plunger assembly, and also to eliminate such shock or jar as may be occasioned by the locking of the frame J to the table, I preferably provide the auxiliary cylinder-piston assembly 33—33b (Fig. XVI) for the purpose of advancing the frame J; but so control the admission of motive fluid to the cylinder that this action does not become effective until the locking movement of the arm 32c has been substantially completed.

As shown in Fig. XVI, the cylinder 33 is offset with relation to the axis of rotation of the press mechanism frame J—i. e., the axis of the column shaft 23—and its piston 33b is operatively connected by means of a link 33c to a stationary lug 33d carried by a convenient portion of the machine frame. With this arrangement the closed end of the cylinder 33 actually moves away from the piston 33b, when motive fluid is admitted to the cylinder, and this causes the cylinder 33 and the frame J, on which it is rigidly secured, to swing about the column shaft 23 and to therefore move in unison with rotating table 4.

Motive fluid at the desired pressure is supplied to the locking cylinder 32 by a conduit 34 which enters a chamber in one of the hollow side columns of the machine frame; passes therefrom to a pipe 34b that leads to a passageway 34c in the central column 23 on which the press table 4 is rotatably mounted; and enters the cylinder 32 through a segmental port 34d in the sleeve hub bearing of the oscillating plunger frame J, and a hollow ported guide rod 34e that slidably engages the adjacent end of this cylinder (see Figs. XII and XVI). The admission and exhaust of motive fluid to and from the pipe 34b is controlled by a valve 34f which is actuated, at the proper intervals, by a series of face cams 35 on the upper surface of the blow mold table 6;—the location of these cams being such that the valve 34f is opened just before a press mold on the connected press table 4 reaches the position C—or the beginning of the "pressing" arc (Fig. I)—and is permitted to close, under the action of a return spring 34g, when this same mold reaches the end of that arc.

Motive fluid is supplied to the auxiliary power cylinder 33 through a passageway 36 that leads from the segmental port 34d to the outer end of the said cylinder, (see Fig. XVI); and the flow of air therethrough is controlled by a balanced piston valve 36b (see Fig. XVIII) that is opened and closed by the engagement of a laterally extending arm 32f on the locking lever 32c, with two adjustable collars, or nuts, on the stem of the valve 36b.

When compressed air is admitted to the cylinder 32 (by the opening of the valve 34f) the latter is moved inwardly and the lever 32c is thrown into engagement with one of the pintle bolt heads 24a, thus locking the upper press plunger frame to the press table 4. Just before this locking action is completed the valve 36b is moved downwardly, by the engagement of the arm 32f with the lower collar on the valve (36b) stem and communication as thus established between the port 34d and the auxiliary power cylinder 33. The resultant flow of motive fluid to this cylinder (33) exerts a rotative pressure on the press frame J which is sufficient to overcome its inertial and frictional resistance to forward movement, and thus eliminates any shock or added strain on the table actuating mechanism, during the initiation and continuance of the movement.

The motive fluid which is supplied to the plunger cylinder 31d, for the purpose of moving the press member 31, is admitted thereto from the locking cylinder 32, through a port and passageway 37 which is only opened when the cylinder has been advanced to lock the press assembly to the table, so that the plunger can only be operated while it is moving in registration with one of the press mold units. The direct admission and exhaust of the motive fluid to and from the opposite sides of the piston 31c is further controlled by a balanced double piston valve 37b, which is so arranged that when the valve is in its upper position (Fig. XII) it admits the fluid to the upper end of the cylinder 31d and establishes communication between the other end and to the atmosphere, and when in its other position reverses these connections. The positioning of this valve (37b) is determined and controlled by two fixed cams or dogs 37c, 37c (one of which is shown in Fig. XII, and both of which are conventionally indicated by dotted lines in Fig. XVI), that are attached to the machine frame in such location that they engage a finger or head on the upper end of the valve stem, when the frame J is approaching the ends of its oscillating movement, and thereby shift the valve just before this movement is completed.

The complete cycle of the upper press assembly action is as follows: As the continual rotation of the intergeared tables 4 and 6, brings one of the newly charged press molds 3 into substantial radial alignment with the initial position of the press frame J (i. e., to the beginning of the "return" arc, or "arc of return" Figs. I and IV), the valve 34f is opened by one of the cams 35 on the blow mold table 6 and compressed air is admitted to the cylinder 32. The resultant movement of this cylinder actuates the connected arms 32c and 32f, thus locking the frame J to the table 3, and concurrently opening the valve 36b to admit motive fluid to the auxiliary power cylinder 33 and thereby assist the continued forward movement of the interlocked parts. The completion of the locking movement also opens the port and passage 37 and the resultant flow of motive fluid to the upper end of the press cylinder 31d, through the then raised valve 37b, forces the plunger 31 downwardly into the molten glass charge in the sub-adjacent mold 3 and forms the parison blank. When the interlocked table and frame members 3—J approach the terminus of the "pressing arc", the corresponding shift cam 37c engages the stem of the valve 37b and moves the latter downwardly to admit compressed air to the lower end of the press cylinder, (the upper end thereof being concurrently opened to the atmosphere), and thus lifts the plunger 31 out of the mold before the press frame is unlocked from the press table. Immediately thereafter,—while the rotating parts are moving over the short angular interval between the end of the "pressing arc", and the beginning of the "arc of return"—the cam element 35 releases the valve 34f and permits the latter to move downwardly under the action of the spring 34g. This cuts off the supply of motive fluid to the cylinder 32 and opens it to the atmosphere, thus allowing the cylinder and arm elements 32—32c to return to their initial or inactive positions under the pull of the spring 32d, and thereby unlocks and releases the frame J from the table 3. This return movement also lifts the valve 36b and opens the cylinder 33 to the atmosphere. The upper press assembly is under the control of a powerful tension spring 38, which is attached at one end to a projecting lug 31e on the cylinder 31d, and at the other to a suitable post 38b on the machine frame. The relative operation of these lug and spring connections is such that during the return movement—and just before this movement is completed—the connections are in radial alignment, (see Fig. IV). At this point the spring tension is a minimum, and its return action on the frame J is zero, but the press assembly is then moving at a considerable velocity, and its acquired momentum carries it back to the beginning of the "return arc", under the now increasing resistance of the spring 38, which thus acts to gradually check this momentive recoil and bring the frame to rest at the proper point to allow it to be again locked to the table 4 in registry with the succeeding press mold 3. Just before, or concurrently with, the completion of this return movement, the corresponding shift cam 37c (shown in full lines in Fig. XII) engages the stem of the valve 37b and moves the latter to its upper position, thereby permitting the readmission of live motive fluid to the upper end of the plunger cylinder 31d, as soon as the port and passage 37 is again opened by the next action of the locking mechanism.

The lower press plunger mechanism (J) which cooperates with the mold assemblies 3a carried by the lower platform of the table 4, is in many respects similar to the upper press plunger assembly (J) just described, and like it is arranged to oscillate around the column shaft 23, and to be locked to the table 4 as a preliminary to the operation of the press plunger 31a. This assembly is illustrated in Figs. XII, XVII, XIX, XXV, XXVII, and XL and includes an oscillating frame J', which carries mechanisms equivalent to the plunger operating parts 21, 31c—31d, the locking members 32—32b—32c, etc., and the auxiliary power cylinder elements 33—33b, etc. of the frame J' previously described. The illustrations of Figs. XXV and XL make it apparent that the press plunger 31a must be tilted during the return movement of the frame J, in order to clear the mold assemblies 3—3 etc. of the upper deck. For this reason the frame J' is formed in two parts 39 and 40 which are pivotally secured to each other by means of a large cross shaft or trunnion 39a which permits the part 40 to be rocked outwardly with relation to the column shaft 23, and to thereby move the plunger 31a from the operative position shown in Fig. XXV, to the inoperative dotted line position of Fig. XL. In order to avoid multiplicity of parts I also utilize the tilting movement of the frame member 40 for locking the entire assembly J', to the table 4 and for disengaging it therefrom at the beginning and end of the "return arc" or "arc of return" previously described.

As best shown in Figs. XVII, XX, and XXV, the plunger 31a is provided with an upwardly extending shank 31k which slides in a cylindrical bearing at the top of the member 40, and with a laterally extending head 31m, which engages with guides 40a on this same member, and is actuated by a pneumatically operated piston 31n, that is mounted in a cylinder 31o and is connected to the head 31m by a piston rod 31p. The cylinder 31o and the associated mechanisms are all carried by the tiltable portion 40 of the frame J'.

In order to accomplish the tilting of the frame portion 40, it is, in effect, mounted on a pair of rollers 40b—40b which are rotatably secured in the lower ends of piston members 40c—40c (Fig. XIX) that are adapted to slide up and down in cylinders 40d—40d on the tilting frame. The rollers 40b engage an arc shaped track 41, the center of curvature of which is coincident with the center of the column shaft 23 (Figs. XII, XVII, XIX, and XX).

The portion 39 of the frame assembly J', is trunnioned on the column shaft 23 and is provided with an auxiliary cylinder 33a (Figs. XII and XXV), which together with its piston, piston rod, etc., is the equivalent of the auxiliary cylinder combustion 33—33b etc. of the frame J and is therefore not illustrated in complete detail. The means for delivering motive fluid to the cylinders 40d—31o and 33a are so interassociated that motive fluid cannot be delivered to the cylinders 31o and 33a until after it has entered the cylinders 40d, and has acted to lift those members—together with the frame 40 on which they are mounted—upwardly, with relation to the track supported pistons 40c—40c, and thereby move the said frame (40) into locked engagement with the table 4. These means differ in some respects from the equivalent devices used in conjunction with the upper press assembly members, and will now be briefly described.

The motive fluid for operating the lower press assembly J', is supplied thereto from the conduit 34 (Fig. XII) through a pipe 34a that is provided with the valve 34k, which is in all respects similar to the valve 34f, and which is illustrated in detail in Fig. XIV. This valve, like the valve 34f, is actuated by a series of cams 35a, which are adjustably secured to the upper deck of the annular blow mold table 6, and which engage with a cam roller 34m carried by the valve stem 34p. When this valve is lifted, against the action of the return spring 34n, it opens an elongated port 34o, and thus establishes a connection between the conduit 34 and the pipe 34a, and when it is allowed to close by the disengagement of the cam elements 35a—34n the port 34o is placed in communication with the exhaust opening 34q.

The motive fluid which is admitted to the pipe 34a enters a central pipe and passageway 34s, which extends from the top to the bottom of the shaft column 23 and which communicates at its lower end with a passageway 34s (Fig. XXV) that leads outward through one of the side arms of the frame member 39 to the hollow trunnion shaft 39a. The interior of the hollow trunnion is connected, through the segmented port and pipe connections 34t, with the admission ports 34v—34v at the upper ends of the cylinders 40d (Fig. XIX); and when motive fluid is admitted to the system, by the opening of the valve 34k it first acts to effect a relative separation of the piston-cylinder parts 40c and 40d, and thus moves the frame members 40 to their upright operative position.

The completion of this movement uncovers ports 40e and thereby admits motive fluid from each cylinder 40d into a valve chamber 40f, which as shown in Fig. XIX is located between the two cylinders 40d, and contains a balanced piston valve 40g that corresponds to the valve 37b previously described. In the position illustrated in Figs. XIX and XXV, this valve is adapted to admit motive fluid to the upper end of the press plunger actuating cylinder 31o and to open the lower end of that cylinder to the exhaust. In its other position, it admits motive fluid to the lower end of the cylinder 31o and opens the upper end thereof to the exhaust. The movement of the valve 40g is controlled by a lever 40i, which is adapted to be engaged by stationary cam fingers 40k—40m (corresponding in function to the cam elements 37c—37c of the upper press assembly) which are carried by the machine frame, and are so located that one of these fingers engages the cam roller carried by the lever 40i when the oscillatory frame J', is in its initial position at the beginning of the return arc, and thereby moves the valve upwardly to admit motive fluid to the upper end of the cylinder 31o, and the other of said fingers engages the upper end of the valve stem, as the frame J' reaches the end of the pressing arc, and moves the valve downwardly to admit the motive fluid to the lower end of the press plunger cylinder.

The tilting of the frame member 40 also controls the delivery of motive fluid to the auxiliary power cylinder 33a through the agency of the valve 36e and a finger 40m carried by the frame 40, and operating between spaced tappets carried by the stem of the valve 36e. The arrangement of these parts is such that as the frame member 40 moves to the upright position, the finger engages the lower tappet and shifts the valve to admit motive fluid to the passageway 36c that leads to the outer end of the cylinder 33a thus imposing a relative force on the cylinder and the frame 39 to which it is secured in the same manner, and for the same purpose as has been described in connection with the operation of the auxiliary power cylinder 33. The tilting back of the frame member 40, to the inoperative position indicated by the dotted lines in Fig. XL, causes the finger 40m to engage the upper tappet of the valve stem and lift the latter, thus opening the passage 36c to the atmosphere and permitting the frame assembly 39—40 to be returned to its inital position by the cooperative action of the springs 38a and 33k (Figs. XI, XII, XVII, XXVII, and XX).

The arrangement of the spring 38a with relation to its association frame J', is the same as that described in connection with the spring 38 and the frame J; and this spring (38a) therefore functions both to retract the frame J', after it is unlocked from the table 4, and to gradually check its momentum recoil at the end of the return movement. The action of this spring 38a is supplemented by that of the spring 33k which, as clearly shown in Fig. XXVII, extends between a stationary part on the machine frame and a suitable lug connection at the outer end of the cylinder 33a. The spring 38 which acts on the frame J may also be supplemented by a second coil spring (33kk) attached to the cylinder 33. With this arrangement, both the coil springs, attached to each oscillating press frame (J or J') will initiate the retractive movement thereof; and the spring 33k (or 33kk), will continue to exert a retractive force throughout the return movement; whereas each spring 38 and 38a will first act to accelerate and then gradually check that movement, and thus prevent an overthrow of the frame beyond its proper initial position.

The tiltable member 40 of the frame J' is provided with a pair of inwardly projecting lugs 40p—40p and when this member is moved inward and to upright or operative position, these lugs engage one of the four notches 42 which are formed in the periphery of the lower platform of the table 4, (see Figs. XVII, XIX, and XX), thus locking the lower press assembly to the press table in registry with one of the lower bank of blank molds 3a.

The operation of the frame assembly 39—40 and of the parts carried thereby is as follows:

As the frame completes its retractive movement under the influence of the springs 38a and 33k, the valve 34k is opened to admit motive fluid to the cylinder 40d and thereby move the member 40 to its upright operative positive, at the time when the axis of the lower press plunger 31a is in approximate radial alignment with the center of the adjacent press mold 3a. The engagement of the beveled lugs 40p, with the sides of the opposing notch 42 corrects any error in this approximate alignment, and locks the press and table parts together, is proper registry with one another. As the tiltable member 40 of the frame J' arrives at the upright position the ports 40e are uncovered, thus admitting high pressure motive fluid from the cylinders 40d to the chamber of the valve 40g. The return of the frame J' to its initial position has previously positioned the valve 40g in its upper position (by the engagement of the cam 40n with the roller at the only end of the valve lever 40i) thus permitting the motive fluid to enter the upper end of the press plunger actuating cylinder 40d and to move the plunger 31a downwardly into the sub-adjacent blank mold. As the member 40 moves to its upright position the arm 40m carried thereby, shifts the position of the valve 36e thus admitting motive fluid to the auxiliary power cylinder 33a. With the parts in the positions described, the frame assembly 39—40 is locked to and moves with the table 4—the auxiliary power cylinder and its associated elements aiding this unitary movement of the interlocked parts.

As the press frame assembly and table approach the end of the "pressing arc" the press plunger 31a completes the pressing operation, and the advancing end of the valve lever 40i is engaged by the cam 40k, thereby shifting the position of the valve 40g to open the upper end of the cylinder 31o to the exhaust and admit fluid under pressure to the lower end of that cylinder;—thus lifting the press plunger 31a out of the then associated mold 3a. It will be apparent that the end cam 40k must be so positioned that it actuates the lever 40i before the frame assembly completes its travel with the table; that is to say, this finger must be so positioned that the frame assembly will continue to travel with the table and to remain locked thereto until after the press plunger is raised above the confines of the mold assembly with which it is then associated. As the frame assembly J' approaches the limit of its movement with the table, the cam roller 34m rolls off the then active cam element 35a, (Figs. XII and XIV), thus causing the valve 34k to cut off the supply of motive fluid and at the same time open the pipe 34a to the atmosphere. The resultant exhaust of the cylinders 40d allows the track engaged portions 40c—40c to move upwardly relatively to their enclosing cylinders 40d until they are engaged by the adjustable stop screws 43, thus permitting the associated frame members to rock outwardly, under their own weight, about the trunnion 39a and thereby moving the press plunger 31a to the position shown in dotted lines in Fig. XL.

This movement opens the valve 36e—thus permitting the escape of motive fluid from the auxiliary power cylinder 33a—and coincidently unlocks the frame assembly J' from the table 4 by moving the lugs 40p out of the table notch 42; and as soon as this occurs, the springs 38a and 33k cooperate in initiating the retraction, and return of the frame assembly to its initial position. At or near the end of this return movement the cam finger 40n engages the roller at the outer extremity of the valve lever 40i and lifts the valve 40g to its upper position ready for the succeeding cycle of operation.

In order to more fully illustrate and explain the operative association and interrelation of the various cylinders and associated mechanisms which are employed to actuate the press plunger assemblies J and J'— and to also exemplify various alternative arrangements which may be used in that connection—reference may now be made to the semi-diagrammatic showing of Fig. XLVI. In this figure the three cylinders—to wit, the press plunger cylinder, the locking cylinder and the auxiliary power cylinder—are indicated respectively by the numerals 45, 46 and 47. Motive fluid is admitted to this system from a conduit 34' which contains a valve 48 that is actuated by a cam 49 on the main drive shaft s of the machine; and when this valve is opened, the fluid first enters the cylinder 46, and actuates the piston 46a to lock the press assembly to the press table. The movement of this piston opens a valve 49 which admits motive fluid to the cylinder 47 and thereby advances the piston 47a to assist the forward movement of the interlocked parts, and coincidently uncovers a port m in the side wall of the cylinder 46, through which the fluid passes to the chamber of the double piston valve 50, that controls the admission of this fluid to the press plunger cylinder 45. The setting of this last mentioned valve (50) is, in turn, determined by the position of the piston 47a, (which is connected to, and moves with the press plunger assembly), through the action of tappet elements 47b and 47c, which successively engage the free end of the valve lever elements 50a, when the said piston 47a is at the opposite ends of its stroke, thereby moving the valve 50, in such manner as to admit motive fluid to the top of the press plunger cylinder 45 when the assembly is returned to its initial starting position (i. e., when the piston 47a is at the top of its stroke), and to the bottom of that cylinder (45) when the assembly has been moved to the end of its pressing arc, (i. e., when the piston 47a is at the bottom of its stroke).

The succession or sequence of steps performed by the mechanism diagrammatically or conventionally depicted in Fig. XLVI is the same as characterizes the operation of both the press assemblies J and J', previously described, although the three arrangements differ from each other in mechanical detail. But in all of them the actuating motive fluid is first admitted to the cylinder of a pneumatically operated locking mechanism, and is then, by the action of this locking mechanism itself, concurrently supplied to two other pneumatically actuated mechanisms one of which assists in moving the interlocked press and table parts during the period of such interlocking, and the other of which effects the shaping of the parison or blank in the press mold units, and it is also apparent that the interrelation of these cooperating mechanisms is, in all cases, such that the movements of the press plunger are so controlled that they can only occur while the press assemblies are locked and held in registry with the moving press molds; and that the unlocking of the said assemblies from the moving table, and their return to initial position (ready for the next cycle of action) can only take place when the motive fluid is concurrently exhausted, or discharged to the atmosphere from both the locking cylinder and the cylinder of the auxiliary power mechanism (which assists the forward movement of the interlocked parts) by the opening of a valve in the supply conduits to these two cylinders. It is further apparent that the opening of the last mentioned valves does not exhaust the motive fluid from the bottom of the press cylinder, because the port which leads to the chamber of the reversing valve (37a, 46g or 50) is immediately closed by the initial backward or return movement of the piston (31c, 46c or 46a) of the locking mechanism; and the press plunger is therefore held at the top of its stroke until the last mentioned reversing valve is moved to its upper position at the end of the return movement.

Returning now to a further consideration of the construction disclosed in Figs. I to XL inclusive, it will be noted that the table 4 is supported by a ball bearing which is mounted on a massive pedestal 23c which also carries the fixed cam element that serves to control the movements of the body sections of the lower part of press molds 3a. As shown in Figs. XXV, XXVI, and XXVII this pedestal is so formed that the oscillating frame member 38 with its associated power cylinder 33a, etc., may be conveniently located between it and the bed plate 23a, without interfering with its action as an adequate and rigid support for the table 4. The arrangement is also such that when the tilting portion 40 of the oscillating frame assembly is in the upright position, as shown in Fig. XXV, one or more rollers 52 which are carried by it, engage the lower face of the pedestal 23c, and thereby transmit the upward thrust on the press plunger cylinder 31o to the machine frame, during the pressing operation; and when the frame member 40 is unlocked from the press mold table and rocked back to the dotted line position of Fix. XL the roller and pedestal elements 52—23c are disengaged. The upper press assembly frame J is also provided with one or more rollers or balls 52b, which are interposed between it and the adjacent portion of the overhead truss members 23b of the machine frame, and which serve to resist the upward thrust on the press plunger cylinder 31d, while the parison blank is being formed, and thus relieve the side thrust on the column bearing of the press frame.

From the foregoing it is apparent that the cycle of operation in connection with each mold of both series of molds 3 and 3a carried by the press table 4, is the same; and that each of these mold units receives a charge while the mold is closed and while the table 4 is moving. This charge is acted upon by the associated press plunger 31 or 31a, as the mold table moves through the arc heretofore referred to as the "pressing arc" and during this period of operation, the entire press plunger assembly is not only carried with, but is also locked to the table. When the pressing is completed the press plunger is first withdrawn from the mold, and the press assembly is then released from the table, and is moved back to its initial position where it again engages the table to perform the pressing operation in connection with the next successive mold of the series with which the press plunger is associated. The body mold sections of the mold unit containing the pressed blank then start to open, thus exposing the lower portion of the blank. During this operation the mold in question is moving toward the inner periphery of the blow mold table 6, preparatory to transferring the pressed parison to one of the molds 5 (or 5a) on that table.

As previously stated, the blow table 6 is of annular form, which surrounds the table 4, and is so located with relation thereto that the circular paths of movement of the molds 3 and 5

(or 3a—5a) intersect or are tangent to each other, at the point of transfer. This arrangement makes it possible to gear the two tables together at the point of tangency—as will hereinafter be more fully described—and thereby move the two sets of molds, 3—3a and 5—5a, at the same circumferential speed. In this connection it may also be stated that all the operating parts heretofore described, with the exception of the oscillating frames J, J', are directly driven by a motor 53 mounted on the upper portion 23b of the machine frame and operatively connected to the main drive shaft S (as best shown in Figs. I, XI, and XXIX), in such manner that this shaft makes one revolution while the intergeared tables 4 and 6 are moving through the angular interval between two successive molds.

The annular table 6 is supported by an annular ball race 6b, which, as shown in Figs. XII and XXV, may be integrally formed as a part of the bed plate 23a of the machine frame. With this arrangement, both of the tables 4 and 6 are mounted on rigidly supported ball bearings, that present a low coefficient of frictional resistance, both in the starting and during the continued operation of the moving parts. This feature of construction is of particular advantage when the continuous rotary movements of the revolving tables are successively decelerated and accelerated during successive steps of the feeding and forming procedure (infra).

*Blowing mechanisms*

As previously stated, the blow mold table 6 is provided with two decks, and each deck carries a series of mold assemblies;—those carried by the upper deck being designated by the numeral 5, whereas those carried by the lower deck are designated by the character 5a. Each mold assembly includes symmetrically formed mold sections 5b which are hinged together on a pintle pin 54, which extends from the bottom platform to the top plate of the table 6. As shown in Fig. XV, a liner sleeve 54a surrounds the pintle 54 and forms a continuous bearing for the integrated portions of the separable mold sections 5b.

In order to accomplish the transfer of a blank or parison from a press table mold 3 (or 3a) to a blow mold (5 or 5a), it is necessary to first open and then close the two sections 5b of each blow mold assembly. The means employed for opening and closing these sections and for locking them in the closed position comprise a pair of interengaged gear sectors 55 which are carried by vertical shafts 56, that are rotatably mounted on the table 6, and which are each operatively connected to its associated mold section 5b by means of toggle links 5c. One of each pair of gear shafts 56, projects through the bottom platform of the table 6 and is provided at its lower end with a cam arm 56a which is rigidly secured thereto, and which carries at its free end a cam roller 56b. A stationary cam track 57 is so located and positioned on the base of the machine frame that it engages each cam roller 56b to close and lock the associated mold sections 5b as the molds 5 (or 5a) approach and pass the transfer point A; and to hold them in locked relationship during the rotation of the table through the "blowing arc" indicated in Fig. IV. Another stationary cam track 57a is so mounted on the machine frame that it engages each cam roller 56b as it runs off of the cam track 57 at the end of the "blowing arc" and sets thereon to open the associated mold sections 5b as the molds 5 (or 5a) move forward toward the transfer position A.

Each blow mold assembly is equipped with a blow head 58 which, as is customary, is so mounted that it may be moved over and engaged with the upper open ends of the closed blow mold sections (for the purpose of blowing out the pressed parison blank) and then disengaged and moved away from the blow mold, for the purpose of permitting these sections to be separated—to remove the blown article—and then closed around another pressed parison at the transfer station. As shown in Fig. XV, each blow head 58 is rigidly secured to the upper end of the pintle pin 54 on which the associated mold sections 5b are hinged. This pin is itself rotatably mounted in the table 6, and is also adapted to be moved longitudinally through its bearings and the liner sleeve 54a for the purpose of first lifting the blow head out of engagement with the associated closed mold sections 5b and then swinging it through 180°, or to a position, such as illustrated in Fig. XV, that the blow head will not interfere with the removal of the blown article or with the next parison transfer operation.

The longitudinal movement of each pin pintle bolt 54 is controlled by a stationary cam track 59 which, as shown in Figs. XII and XXV, is rigidly secured to the base of the machine frame, is annular, and is concentric with the ball race 6b. (See also Figs. XXXI, XXXII, and XXXIII).

As illustrated, the cam track 59 is provided with a laterally extending top flange 59a and each pintle 54 is provided at its lower end with a U-shaped head 54b so formed that rollers 54c and 54d carried by it respectively engage the upper and lower faces of the flange 59a. With this arrangement the vertical positioning of each pintle 54 is positively controlled by the cam track 59. A reference to Fig. XXXIII shows that each head 54b is rotatably mounted on its associated bolt 54, and is so shaped that it is held in fixed angular relationship to the flanged cam track 59—59a; so that any rotation of the connected pin and blow head elements 54 and 58 does not disturb the engagement of the rollers 54c and 54d with the controlling cam track 59—59a.

In order to turn each blow head 58 to the positions above described, each pin 54 is provided with a gear 54e which is splined or otherwise rigidly secured thereto, and which is adapted to be engaged,—as the table 6 is rotated with stationary gear sectors 54f and 54g (Figs. XX and XXV), that are circumferentially positioned at or near the beginning and the end of the "blowing arc" and each of which is of such length as to turn the gear 54e, and consequently the associated pin 54, through 180° as the gear moves along it. A reference to Fig. XXXI, which is a developed section of the table 6 and of the cam track flange 59a discloses that, as the table moves in the direction indicated by the horizontal arrows associated with the view, the upwardly inclined portion of the cam track, at the left of this view, first raises each pin 54, and that, immediately thereafter, the gear 54e carried by the thus elevated pin, moves into mesh with the gear sector 54f, thus turning the blow head 58 through 180°, or to the position shown in Fig. XV. The continued movement of the table past the transfer point A brings this same gear into mesh with the stationary gear sector 54g, and turns the connected pin and head members 54—58 through an additional angle of 180°, and into vertical registry with the associated blow mold unit. The blow head is then drawn down onto the blow mold by the downwardly inclined part of the cam track at the right hand end of Fig. XXXI, preparatory to the admission of blowing arc to the interior cavity of the pressed parison which had previously been transferred thereto (at station A).

As shown in Fig. XX, the gear sector 54f is located immediately adjacent to the forward end of the mold-opening cam track 57a; and it is therefore apparent that each blow head 58 is first raised out of contact with the closed mold sections 5b and then swung through 180°, prior to the opening movement of these blow mold sections. An inspection of this same figure (XX) shows that the positioning of the gear sector 54g is such that the blow head is not again turned through 180° until after the mold sections 5b associated therewith are closed around a blank or parison at the transfer point (A) and not until the opened, or partially opened, body and neck ring sections 3b—3c of the blank mold 3 (or 3a)—from which a pressed parison has just been transferred to the cooperating blow mold 5 (or 5a)—have been moved out of the path of the blow mold, or to such a position that they will not interfere with the re-setting of the blow head on its associated mold unit. In order to avoid confusion I have not illustrated this gear sector 54g in Fig. XX, but reference to Figs. XXVII and XXXI, in connection with the foregoing statements, makes it apparent that it is located between the transfer point A and the position of the first blow mold (5a) to the right thereof.

In order to insure proper positioning of the blow head elements in their open (inactive) and closed (active) positions, I provide each of these members with two conical recesses 58a—58a, which are adapted to be engaged by the coned end of a detent pin 58b (Fig. XV), this is slidably mounted in the top plate of the revolving table 6 and is held down against the upper face of the head 58 by a tension spring 58c that is attached at one end to a lateral projection on the pin 58b and at the other to the reciprocable and rotatable pintle bolt 54. These conical recesses 58a are located 180° apart, with reference to the axis of rotation of the blow head 58, and consequently coact with the detent pin 58b to yieldingly hold the blow head in corresponding positions. It will, of course, be understood that the associated pintle bolt gear 54e rolls out of mesh with the actuating gear sectors 54f or 54g just as the detent pin 58b enters, or snaps into one or the other of the recesses 58a.

Blowing air is delivered to each blow head 58 through a passageway 54i, formed in the connected pintle member 54 (Figs. XV, XXXII, and XXXIII). The upper end of this passageway communicates with the interior of the blow head by means of a lateral passage 58d and the lower end is also provided with a radial port opening 54k which, when the head is in blowing position on the mold, registers with an air delivery passage 61 formed in the lower platform of the table 6. The arrangement is such that when the head 58 is raised and turned to the position illustrated in Fig. XV, communication between the passages 54i and 61 is cut off, but when the head is turned through an additional arc of 180° and lowered onto the associated blow mold unit, communication is established between these two passages.

*Air distribution*

The motive fluid which is utilized to operate the various pneumatically actuated parts of my improved apparatus is preferably supplied at two pressures, i. e., at a pressure such as is suitable for actuating the various cylinder-piston motivated parts and at a lower pressure such as is suitable for blowing the pressed parison blanks into finished articles. The high pressure air which is preferably employed for actuating the shear mechanism, and the several cooperating parts of the two press plunger assemblies J and J', is supplied through the conduit 34 and the several pipe connections 20a—34—34a, etc., leading therefrom; and the low pressure air, which is used in blowing the blanks (and also in regulating the extension of the glass from the feeder chamber 2a), is supplied through a second larger conduit 62, to a chamber 62a in the lower part of one of the side columns of the machine frame, from which it passes to the distribution system for the blow heads (through the passage 62b) and to the bell 1b (through the pipe 12d etc.) Fig. XII. All of this motive fluid may, however, be supplied from one source;—the desired pressure of delivery to the different parts of the apparatus being obtained and regulated by the use of any of the well known forms of automatic pressure reducing valves, or in some cases by the employment of manually controlled throttle valves.

The low pressure air that is supplied to the chamber 62a is delivered therefrom to an annular reservoir 61a which is formed in the lower platform of the blow mold table 6, and which is always in open communication with the passages 61 that lead to the lower ends of the bottom pintle bolts 54.

In order to maintain a substantially constant supply of low pressure air in the chamber 61a and at the same time avoid the objectionable features of a continuous connection between this moving reservoir and the stationary reservoir 62a, I provide a series of valves 61b which are carried by the revolving table 6 and which are adapted to cooperate in succession with a stationary valve 62c, carried by the machine frame, in such manner that the conjoint action of the two valves 61b and 62c permits the low pressure fluid to flow from the passage 62b to the annular reservoir 61a, wherein one of the moving valve elements (61b) passes under the stationary valve element 62c.

The detail construction and cooperative arrangement of these elements are clearly shown in Figs. XII and XIII, and as there shown, each of the valves 61b is carried in a perforated valve cage 61c, which projects downwardly into the reservoir 61a and has its inlet port flush with the outer surface of the upper wall of that reservoir. Each valve element 61b is mounted on a valve stem which extends through a suitable boss in the lower end of the open cage 61c, and is normally held against the seat of the inlet port of the cage, by a coiled spring 61d which surrounds the valve stem. Thus, it will be apparent, the valve is normally held closed by the spring 61d and also by the pressure of the air within the chamber 61a.

The cooperating stationary valve 62c is enclosed within a casing 62d which is carried by the stationary column of the machine frame and which is in communication with the reservoir 62a through the passageway 62b. The valve 62c is mounted on a valve stem 62e, which passes downward through a perforated diaphragm in the outlet port of the valve casing and which projects upward through a suitable packing gland in the top of the casing; and the valve is normally held against its seat by a spring 62f. The lower face of the valve casing 62d is flanged and is provided with suitable packing pads 62g which are adapted to engage the upper face of each valve cake 61c, when these cages are successively moved into registry with the casing 62d. The rotating table 6 is also provided with a series of beveled edge fingers 6h which are located immediately above each of the valves 61b in such a position as to engage and depress the upwardly projecting end of the valve stem 62e as they are moved over and past that stem.

With this arrangement each successive finger 6h opens the valve 62c, as it engages and slides over the valve stem 62e, and the depression of the valve stem concurrently opens the valve 61b, which is at that time located immediately below it. Air under pressure is therefore delivered from the chamber 62a—through the passage 62b, the valve casing 62d, the inlet port of the valve cage 61c—to the annular reservoir 61a as long as the lower end of the depressed valve stem 62e remains in contact with the upper face of the valve 61b. As the finger 6h moves out of engagement with the valve stem 62e the spring 62f closes the valve 62c thus raising the valve stem 62e and permitting the valve 61b to be also closed by its cooperating spring 61d. The seal between the casing 62d and cage 61c is then broken by the continued movement of the table, but the closure of the valves 62c and 61b, prevents any leakage of air from either of the chambers 62a or 61a. It will thus be apparent that air under pressure is periodically delivered to the blow head supply system; that each delivery is accomplished while the pads 62g are effective in packing the joint then existing between the valve casing 62d and one of the sub-adjacent valve cages 61c; and that the number of such deliveries will depend upon the number of valve units and valve operating fingers (61b and 6h) with which the table 6 is equipped.

Cycle of operation of each blow mold assembly

From the description heretofore given it will be apparent that the cycle of each blowing operation starts with the transfer of a parison from a press mold (3 or 3a) to a cooperating blow mold 5 or 5a. This is accomplished at the point of substantial tangency between the circular paths of travel of the mold centers, and while the body sections 3b of the press mold are open. The transfer is accomplished by closing the sections of the cooperating blow mold around a parison or blank while the same is held suspended by the neck ring sections of the associated press mold and by then opening the neck ring to release the blank. The closing of the blow mold sections is accomplished through the agency of the cam track 57 and the cam roller 56b that is associated with the blow mold unit at the transfer point; and, as stated, the transfer is completed by the concurrent opening of the neck ring sections of the cooperating press mold. The further movement of the table 6 moves the blow head actuating gear 54e of the closed mold unit into mesh with the gear segment, thus swinging the blow head 58 through 180° preparatory to lowering it onto the closed blow mold. Further travel of the table causes the roller 54d to engage with the downwardly inclined portion of the cam track 59a, thus moving the blow head down into sealed contact with the sub-adjacent mold unit and concurrently admitting blowing air thereto through the passages 61, 54i and 58d.

As the table continues its movement, the roller 54c engages the upwardly inclined portion of the cam track 59a, thus lifting the blow head and simultaneously cutting off the delivery of blowing air to it. The blow head is then turned back, through an angle of 180°, by the engagement of its associated gear 54e with the gear sector. As before stated, this occurs just after the associated cam roller 56b leaves the end of the cam track 57, and just before it engages the cam track 57a, and begins to open the blow mold sections 5b.

During the subsequent movement of the table 6 the now filled blow mold moves away from and then toward the transfer position during which interval the blank is blown and then the blow mold opens and the blown article is engaged by and removed from the table 6 by an article delivery device, which I have designated as a whole by the reference character K, and which is described in detail in the following section. When this removal of the fabricated article has been effected, the cam roller 56b is again engaged with the cam track 57, and acts to move the blow mold sections toward and to their closed positions as the now empty blow mold approaches the transfer point, where it receives another pressed parison blank in the manner above described. This completes the cycle of blow mold operation.

Take-off mechanism

In Figs. XI, XXXIV—XXXIX, I have illustrated a new and improved form of take-off or article delivery mechanism, which constitutes a part of my present invention. As here shown, the mechanism includes a plurality of article engaging devices each of which is adapted to reach down into an opened or partially opened blow mold unit; engage the blown article contained therein; and, when the mold sections 5b are sufficiently spread, remove the article therefrom and deposit it on a moving conveyor which will carry it to the annealing lehr.

First, referring to Figs. XI and XXXIV: The delivery mechanism includes two sprocket chains 63 which are vertically spaced, and which cooperate in carrying a plurality of "take-off" devices 64—64a. Each chain meshes with, and is, in effect, carried by a pair of cooperating sprocket wheels 63b—63c, which are mounted on vertical shafts 63a and 63d that are journaled in suitable bearings carried by the machine frame. The sprocket shaft 63d is driven from the motor 53 through the agency of a pair of spur reduction gears 53a—53b, a shaft 53c to which the gear 53b is keyed, a worm 53d on the shaft 53c, and a worm wheel 63e secured to the upper end of the shaft 63d; (see Figs. I, XI, XXV, XXIX, and XXXIV). The shaft 53c is also utilized to drive the vertical shaft S—through the medium of the worm and worm wheel elements 53e—53f—and the gear reduction ratios are such that the linear movement of the sprocket chains 63 is the same as the peripheral speed of the centers of the mold units 3—3a—5—5a; i. e., the chains move through a distance equal to the circumferential spacing between two blow molds for each revolution of the shaft S.

With the arrangement of sprockets and wheels above set forth, each chain 63 moves in a substantially horizontal path. A guard 65 is also preferably employed in connection with each chain; and, as shown in Fig. XI, these guards are so shaped as to cause the portions of the chains, leaving the driving sprockets 63c and moving toward the sprockets 63b, to follow an arc shaped path, whose center of curvature is coincident with the center of revolution of the table 6. The guards for both chains may also be so formed as to assist in preventing any sagging of the chains between their sprocket supports.

Each "take-off" device 64 and 64a is secured to and carried by both chains 63 and all of these devices are therefore constrained to move in parallel relationship with each other as they travel with the chains. There are two sets of these devices; one (64) for engaging and removing blown articles from the blow mold units 5 carried on the upper deck of the table 6, and the other (64a) for performing that function in connection with the blow mold units 5a carried on the lower deck of the table,—the devices of one set being alternately arranged with those of the other set. As best shown in Figs. XXXIV and XXXVI, each "take-off" member 64 is carried by a tubular sleeve 64b, which extends vertically between the two chains 63—with its upper end secured to a link of the upper chain and its lower end correspondingly secured to a link of the lower chain—and which serves as a guide for a longitudinally reciprocable rod 64c. As best shown in Fig. XXXVIII, the lower end of each rod 64c carries a pair of article engaging fingers 64d, which are pivotally connected thereto by a fulcrum pin 64e; and which are also connected, by the links 64d, to a sliding collar 64g on the rod 64c. A coil spring 64i is attached at one end to the collar 64g, and at the other to a pin rigidly secured to the rod 64c (Fig. XXXIX), and is adapted to yieldingly pull the collar downwardly, and thus move the fingers 64d to an expanded position, such as shown in Fig. XXXVIII;—it being understood that this expansion movement may be limited by any suitable stop elements on the rod or on the fingers. Each collar 64g is provided with a laterally offset roller 64k, which is adapted to engage a short stationary section of cam track 66, for the purpose of holding up the collar element 64g, and thus collapsing the finger 64d, when the rods 64c, and the parts carried thereby are moved downwardly to engage a blown article.

The longitudinal movement and the longitudinal positioning of each rod 64c are accomplished by a continuous cam track 67 that is parallel with the path of travel of the chains 63—63 and is adapted to engage with rollers 64m, which are carried by outer sleeve elements 64n and are operatively coupled to the rods 64c by the journal pins 64o that project through longitudinal slots in the sides of the tubular guide members 64b.

The continuous cam track 67 is of such form that as each take-off device is moved into registry with the path of travel of the blow mold— by the guiding action of the revolving sprocket wheel 63c and the guard 65—the rod 64c is permitted to drop, under the action of gravity, and allow the article engaging fingers 64d to enter the open mouth of the blown article carried by the correspondingly positioned blow mold unit. This downward movement is permitted by the downwardly inclined portion 67a of the cam track 67.

In order that the article engaging fingers 64d may be positively retracted or collapsed prior to their entering the open mouth of the blown article the downward movement of the collar 64g is checked by the short cam sector 66 just before the associated rod 64c reaches its lowermost position;—i. e., just before the supporting cam roller 64m reaches the lower end of the inclined cam track section 67a. Immediately after the rod 64c reaches the limit of its downward movement, the associated cam roller 64k rides off the end of the cam track 66, and releases the collar 64g, thus permitting the spring 64i to draw the parts 64e and 64g toward each other and thereby expand the fingers 64d. The next increment of forward movement causes the cam roller 64m to engage with the upwardly inclined leg 67b of the track 67, thus lifting the associated rod 64c and bringing the expanded fingers 64d into engagement with the shoulders of the blown article, as clearly shown in Figs. XXXIV and XXXVIII.

The continued advance of the cam roller 64m along the cam track section 67b—and the resultant upward movement of the rod 64b—lifts the blown article from the mold table 6 and carries it up to a level above the top plate of that table, after which it is moved laterally outward—(by the passage of the chains 63 around the periphery of the sprocket wheels 63b)—until it is suspended above a conveyor track 68 that leads to the annealing lehr (see Fig. I). As the article approaches this last described position, the cam roller 64m starts to move along a second downwardly inclined leg 67c of the track 67, thus again lowering the associated rod 64c. Immediately prior to the time that each roller 64m arrives at the lowest point on the leg 67c the collar roller 64k engages the end of another cam track 66a, thus arresting the downward movement of the collar at the time of engagement of the bottom of the blown article with the conveyor 68. As the rod 64c and its associated parts continue their descent the fingers 64d are disengaged from the shoulders of the blown article and collapsed. The roller 64k then rides upwardly on track 66a, and thereby lifts the rod 64c and its associated parts— with the fingers 64d in their collapsed position— until they clear the top of the previously engaged article; after which the roller 64m is again engaged with the horizontal portion of the track 67 and is moved along it to the beginning of the downwardly inclined section 67a. This completes the cycle of movement of any one of the take-off devices 64.

It should be understood that the conveyor 68 is driven at a lineal speed, which is approximately equal to that of the travel of the chains 63—63, and that the retracted fingers 64d may therefore be withdrawn from the mouth of the article, as the latter is moving with the conveyor, without any material lateral displacement of the take-off parts with respect thereto. It will be apparent from an inspection of Fig. I that the path of travel of the take-off devices, around the guiding sprocket wheels 63b—there diagrammatically illustrated by the dotted lines—is at one point substantially tangent to the line of movement of the conveyor 68; and the positioning of the cam track sections 67c and 66a is preferably such that the suspended article is lowered onto the conveyor and released from the grip of the fingers 64d at or near this point. But it is also obvious that the collapsing of these fingers, and their withdrawal from the mouth of the article, is accomplished in a very short interval of time; and that considerable variation between the paths of travel of the take-off devices and of the released articles will not, therefore, interfere with the above described operation if it is accomplished with reasonable dispatch.

The removal of the blown articles from the mold units 5a on the lower deck of the table 6 is, as previously stated, effected by means of the take up devices 64a. These devices are similar in all substantial particulars to the device illustrated in Figs. XXXVI, XXXVIII, and XXXIX (as above described), except that provision is made for magnifying the longitudinal movement of the rods 64c as the cam rollers 64m ride down and up on inclined legs 67a—67b and 67c of the track 67. This is accomplished by omitting the trunnion connection 64o between the associated roller and sleeve elements 64m—64n and the cooperating rod 64c and substituting therefor the double fall chain and pulley connections 70—70a. As shown in Figs. XXXV and XXXVII, the cam roller 64m is, in this case rotatably mounted on a block 64r, which is secured to the sleeve 64n and which also carries the pulley 70. The chain 70a, which passes over the pulley 70, is attached, at one end, to a bent arm 70b that is secured to the rod 64c and projects outward through superimposed slots in the sides of the sleeve elements 64b and 64n; and is elastically connected at its opposite end to the lower conveyor chain 63a by means of a tension spring 70c. This spring is primarily employed for the purpose of preventing slack in the chain when the rod 64c is lowered. It will be understood that the cam roller 64m of each take-off device 64a is operatively connected to the associated rod 64c only through the agency of the chain and pulley, and that therefore any up or down movement of this roller—as occasioned by variations in the contour of the cam track 67— will produce a movement of the rod which is twice that of the roller. This motion multiplying device therefore permits a single cam track to be employed for actuating both sets of take-off devices, although the one set must have a much larger vertical lift than the other;—because of the greater height to which the articles in the lower tier of blow molds (5a) must be lifted.

In order to effect a positive and definite upward movement of the rods (64c) of the take-off devices 64a, the upper ends of the take up springs 70c are attached to shouldered pins 70d, which pass loosely through laterally projecting lugs 70e on the sides of the associated guide sleeves 64b, and thereby afford vertically fixed points of attachment for one end of the chain 70a when the connected cam roller and pulley elements 64m and 70 are lifted. When the cam rollers 64m of this lower set of take-off devices (64a) pass onto the downwardly inclined section 67c of the cam track, the associated rods 64c are lowered until the rollers 64k engage the horizontal entry part of the cam track section 66c; after which the further downward movement of the connected elements 64m and 70 is taken up by the springs 70c (as shown at the left of Fig. XXXIV). But the articles, carried by the take-off devices 64a still remain suspended therefrom until they are engaged by the conveyor 68, because the springs 64i are insufficient to collapse the fingers 64d as long as they are subjected to the unsupported weight of the suspended article, and the latter is therefore released to the conveyor at substantially the same point as that at which the articles are delivered thereto from the upper set of take-off devices (64).

It should be further noted that the cam track section 66b—which serves to collapse the fingers 64d at the time the take-off devices 64a are engaged with the articles in the lower tier of blow molds 5a—must be positioned at a lower level than the section 66; and that the track section 66c—which effects the disengagement of the lower take-off devices from the articles after the latter are delivered to the conveyor—must be of different form than the section 66a (in order that the upward movement of the cooperating rods 64c may be commensurate with that of the associated roller and pulley elements 64m and 70) and for these reasons the rollers 64k, and the track sections 66b and 66c with which they engage, are positioned on the rear, or inner, side of the conveyor chains—(the sections 66b being in this case attached to the revolving table 6)—instead of on the outer side.

With the exception of the detail differences above noted the operation of the lower set of take-off devices 64a, in removing the blown articles from the bottom tier of blow molds (5a), is essentially the same as the operation of the other set (64) in taking away the articles from the upper bank of molds (5). All of these articles are delivered to the lehr conveyor 68 in regular sequence at uniformly spaced intervals, corresponding to those between the centers of the molds on the tables 4 and 6; although, as noted above, the linear speed of the conveyor 68 may, if desired, be considerably varied (with respect to the table movement) for the purpose of altering the rapidity with which successive articles are carried to the annealing lehr.

Driving mechanism

As heretofore stated, the one motor 53 constitutes the driving means for all the mechanisms herein described, except such parts as are actuated by compressed air. The arrangement and interconnection of these motor driven mechanisms is such that they establish and maintain exact synchronism of movement between the various parts of the feeder and the forming apparatus; and is further such that the vertical drive shaft S heretofore mentioned makes one complete revolution for each concurrent movement of the two tables 4 and 6 through the angular interval between successive molds; and this revolving member (S) therefore performs the additional function of a "timer" cam shaft in controlling the desired and predetermined phase relationship between the regulatable action of the feeder assembly, and the operation of the shear mechanism (H). With this in mind it will be apparent that the gearing connections are such that the press table 4—which as shown carries two sets or banks of four mold units each—makes one-eighth of a revolution (and the blow mold table 6 which carries two banks of ten molds each, makes one-twentieth of a revolution) for each complete cycle of action of the feeder and shear mechanisms. But as already indicated, the number of mold units on the two tables 4 and 6 may be independently varied within wide limits, provided only that the peripheral or circumferential speed of the center of each mold remains the same; or, stated more broadly, if the angular velocities of rotation of the two tables are inversely proportional to the number of molds carried thereby. These requirements as to relative speeds determine the gear ratios between the shaft S and the two tables 4 and 6 for any given number of mold assemblies carried by each table. It will, of course, be understood that where the two decks of a table are non-rotatable with relation to each other, each such deck must carry the same number of molds equally spaced peripherally of the table.

As shown in Figs. I, XI, XXV, XXVI, XXVII, and XXIX, the motor 53 is geared to the shaft 53c, which carries the two worm gears 53d and 53e, one of which engages the worm wheel that drives the shaft 63d of the take-off mechanism K, and the other of which meshes with and drives a worm wheel 53f that is keyed to the shaft S. The lower end of this shaft (S) is connected to a short countershaft 72—rotatably mounted in a lateral extension of the pedestal 23c—(see Figs. XXVI and XXVII), by means of two gears Sa and 72a, which may be either circular (as shown by dotted lines in Fig. XXVII) or elliptical (as shown in full lines in Figs. XX, XXVI, and XXVII), or egg shaped in form (as shown in Fig. XXVIII), but which, in all cases, have a one to one ratio, so that the shaft 72 is revolved once for each rotation of the shaft S.

The upper end of the shaft 72 is provided with a pinion 72b, which meshes with a spur gear 72c that is rotatably mounted on the stub shaft 72d and which is integral with another pinion 72e that is in mesh with the gear 4b of the press table 4. The gear 4b of the table 4 engages with an internal gear 6' formed as an integral part of the blow table 6. The ratio of pitch diameters of the gears 72b—72c—72e—4b and 6' is such that the respective angular speeds of the shaft 72 and the tables 4 and 6 are as 20:2.5:1.

The gears Sa and 72a are of the ordinary circular or cylindrical form when it is desired to drive the tables 4 and 6 at a uniform speed; but if it appears desirable to slow down the movement at the time when the press molds are being charged with glass, and the pressed blanks are being coincidently transferred to the blow molds, I employ elliptical or egg-shaped gears (such as are illustrated in Figs. XXVII or XXVIII) of the proper eccentricity and form to obtain the desired variations in speed, without any interruption or discontinuity in the continuous rotary motion. These momentary and successive decelerations of the mold table movements also facilitate the locking of the press plunger assemblies to the moving tables without sensible shock or jar.

The motor 53 is of the variable speed type, and is provided with a suitable rheostat, or equivalent control device, which is located within easy reach of the machine tender, and which is of such design as to permit of a smooth continuous variation in motor speed over a considerable range. This electrical regulation of the rate of revolution (R. P. M.) of the mold carrying tables, affords another convenient means of controlling and maintaining, uniformity of weight in, the successively delivered mold charges, without disturbing the adjustments of the feeder mechanism, when the temperature, or physical characteristics, of the molten material are subjected to variations, that affect its rate of flow from the delivery orifice.

The maximum commercial speed of operation of the forming machine per se is ultimately limited by the permissible working temperature of the press molds, 3 and 3a; and is therefore dependent upon the effectiveness and rapidity with which the heat, which is transmitted to these molds from the molten glass, can be dissipated or carried away from those receptacles. In order to facilitate this cooling action I have provided press molds which have very thick walls (as compared with the volume of the glass charges which are deposited and pressed therein); and I have made those portions of the press table 4 on which these molds are supported, unusually heavy and massive (as clearly shown in Figs. XII, XV, XXII, XXIII, and XXV) for the purpose of increasing the loss of heat by conduction and radiation. I have also provided means for establishing and maintaining a forced circulation of air currents in the interior of the annular blow mold table 6, and around and through the framework of the circumscribed press mold table 4, for the purpose of facilitating the convection cooling of the rotating parts. In the construction herein shown this last mentioned effect is obtained by providing a set of high speed rotary blowers 80—80a, which are driven by a vertical shaft 80b that is geared directly to the motor 53; and which are so positioned as to direct low pressure currents of air against the peripheries of the moving tables 4 and 6, and against the inner surfaces of the opened mold sections 3b and 5b as they approach the transfer point A (see Figs. I, XI, XX, XXV, and XXIX). It will be understood that additional blowers may be provided, if desired, to maintain a forced flow of cooling fluid against the outside of the press mold sections (3b) after they have passed the transfer point and have been closed to receive and shape freshly deposited charges of molten glass.

The acceleration in the cooling of the press molds—which is obtained, as above described, by accelerating the removal of heat therefrom, both by increased conduction, and radiation, and by forced convection currents—enables me to increase the rate of output per mold by from 30% to 50%; e. g. from a rate of from 4 to 6 articles per mold per minute to a rate of from 6 to 8 articles M. P. M.;—this rate being of course, dependent upon the size and shape of the fabricated product and also upon the temperature of the glass when it is delivered to the press molds. In my improved apparatus the maximum rate of production is not affected, or in any way limited, by the blowing of the pressed parisons to final shape (as it is the case in some other types of apparatus now in use), because the number of blow molds which I employ is, necessarily, materially larger than the number of cooperating press molds; and there is, for that reason, ample time and opportunity for the necessary cooling and setting of the walls of the blown articles (prior to their removal from the machine) and for the dissipation of the absorbed heat from the blowing receptacles.

Figs. XLI, XLII, XLIII, and XLV illustrate certain alternative forms of shear mechanism which may be used in place of the one shown in Figs. VI to X, inclusive. The construction now under consideration presents a number of features—(e. g. a pair of cat's eye shear blades with their attached semi-cylindrical cup guards; a corresponding pair of shear blade supports pivotally mounted in a U-shaped head, and interconnected by bevel gear sectors and a bevel pinion; and a double acting snap spring for alternately resisting and assisting the closing and opening of the shear blades)—which are substantially identical with the corresponding parts of the first described construction, and which do not therefore require further attention. The shear blade elements of this second exemplary severing mechanism are closed by the action of a revolving dog, which is secured to the shaft S; and which is adapted to engage with a cam 15cc that forms a part of the upper shear blade arm;—the general character and mode of action of these engaging elements being the same as is shown in the enlarged view of Fig. X (supra). But in this case the member 15cc is further provided, on its upper side, with a wedge shaped face cam 73, that is adapted to engage with a roller 73a at the lower end of a short stud 73b, which is slidably mounted in the U-shaped shear head, and is engaged in turn by an adjustable stop screw 73c carried by an adjacent portion of the machine frame. With this arrangement the closing of the shear blades by the action of the revolving dog—automatically moves the shear head downwardly, (by the reaction between the wedge cam 73 and the stationary roller 73a); and by properly shaping the face of the cam 73 I can obtain any desired ratio between the concurrent transverse and axial movements of the cutting elements—relative to the glass stream—during the severing operation.

The shear head 16' is provided with laterally extending bosses which slidably engage with the vertical drive shaft S and with an associated stationary guide rod 74, that is carried by the machine frame. The journal pin 15bb, on which the shear blade arms are pivotally mounted, is rigidly secured in the shear head 16' and is extended upwardly to engage with the lower portion of a hollow piston rod 75, which is connected, at its upper end, to a piston 75a, that slides in a fixed cylinder 75b carried by the guide rod 74. When this piston is at the top of its stroke, the shear head 16' is held in its raised position—(with the stud 73b in abutting engagement with the stop screw 73c)—by a tension spring 75c which elastically connects the piston and journal pin elements 75a and 15bb. The admission of motive fluid to the opposite ends of the cylinder 75b, for the purpose of moving the elastically connected members 75a and 16' up and down, is controlled by a triple piston valve 76, whose stem 76a is extended downwardly through a guide block 74a adjustably secured on the guide rod 74, and is provided with adjustable collars 76b and 76c, that cooperate with the tappet elements 76d and 76e, in effecting the shifting or reversal of the control 76. Motive fluid is supplied to the central chamber of the valve 76 through a pipe 76f which leads to any suitable source of supply.

The mode of operation of the above described form of severing mechanism is as follows: In the position shown, the motive fluid supply pipe 76f is in communication with the lower end of the cylinder 75b and all of the parts are held in their raised position ready for the severance of the glass stream. As the shaft S revolves the dog 17'—is engaged, at the proper instant, with the shear arm cam 15cc and acts to close the shear blades,—this closing movement effecting, as already explained, a concurrent downward movement of the cutting elements, which is controlled, in amount, by the contour of the face cam 73, and which is permitted by the stretching of the spring 75c. As the head 16' moves downward the tappet 76d engages the end of a pivoted dog on the valve stem collar 76b, and pulls the valve 76 downward, thus cutting off communication between the supply pipe 76f and the bottom of the cylinder 76b, opening the latter to the atmosphere and concurrently admitting motive fluid to the upper end of the cylinder. The resultant downward movement of the piston 75a, immediately re-engages the end of the piston rod 75 with the shear frame head 16' and carries the latter with it at a progressively accelerated velocity which is of course communicated to the severed charge by the closed shear blade and attached cup guard elements. In this downward movement the dog on the valve stem collar 76b is disengaged from the shear head tappet 76d, by the engagement of a lateral projection on the dog with an adjacent lug on the cylinder frame 75b, and the balanced piston valve 76 is thus left in its lowered position until the piston 75a, and the shear head 16' approach the lower end of their stroke. At this point in the operation, the wedge-shaped cam finger 22', which is attached to the adjustable guide block 74a, engages with a lateral projection on one of the shear blade arms, and cooperates with the double action snap spring in opening these arms in the manner previously described. Concurrently with this action a beveled projection on the head 16' makes contact with the upper end of the tappet lever 76e, and rocks this lever in a clockwise direction on its pivot support to engage and lift the valve stem collar 76c, thereby restoring the valve 76 to its initial position, in which the lower end of the cylinder 75b is in communication with the fluid supply pipe 76f and the upper end is open to the atmosphere. The piston 75a is then immediately returned to the upper end of its stroke, carrying with it the shear head 15' and its associated parts. This completes the cycle of one severing operation.

In the construction last described no means are provided for imparting a lateral or transverse component of motion to the shear head during its downward movement; but the cross sectional area of the cylinder 75b is designedly such that the accelerated velocity imparted to the severed charge—by the action of the motive fluid on the piston 75a—is so great that it will be projected into the press mold before the relatively slow lateral movement of the latter can interfere with its proper reception. In order to attain this result the shear closing dog 17' must of course be so adjusted on the shaft S that the charge is severed just before the subjacent receiving mold 3 (or 3a) is brought into vertical alignment with the axis of the cylinder 75b (see Fig. XLIV); this adjustment varying of course with the peripheral (circumferential) speed of travel of the receiving receptacles, and their vertical distance below the plane of severance. Since this last factor is different for the molds on the two decks of the press table, it may in some instances, be desirable to position the molds (3a) on the lower deck a slight distance to the rear of the half way point between the molds on the upper deck.

In Fig. XLV I have shown a slight modification of one portion of the construction illustrated in Figs. XLI, XLII, and XLIII. In this modification the bevel gear pinion, which connects the bevel gear sectors of the two shear blade arms, is keyed to its supporting shaft (77) and the outer end thereof is provided with a crank arm 77a which carries a pin 77b that is adapted to be engaged by the hooked extremity of a lever 77c, when the shearhead 16' is in its raised position (as shown in Figs. XLI and XLII). The lever 77c is pivotally mounted on the frame of the cylinder 75b, and when the head 16' is moved downward, the engagement of the hooked lever 77c with the crank pin 77b will rotate the shaft 77 and its connected bevel pinion and will thereby close the shear blades. As soon as this has been effected the parts 77b and 77c are disconnected by the engagement of a stud pin 77d on the downwardly moving head, with a projection 77e on the lever 77c. At the end of the downward movement of the shear frame, the shear blades are opened by the engagement of a fixed pin 77*f* with a projecting tooth 77*g* on the crank arm 77*a*.

In operating the modified construction last described the initial downward movement of the shear head 16' may be produced and controlled by the action of a suitably contoured face cam on the shaft S—(which takes the place of the edge cam tooth 17')—and the following accelerated delivery and return movements effected by the pneumatically actuated mechanism shown in Figs. XLI and XLIII. When operated in this way the only material difference between the two constructions shown in Figs. XLI and XLV is that in the first the mechanical closing of the shear blades (by the cam on the shaft S) is the cause of the concurrent axial movement of the shear head; whereas in the second, the initial cam actuated downward movement of this head effects the closing of the cutting elements;—a reversal of cause and effect. But it is also possible to operate the modified construction shown in Fig. XLV, by the use of the cylinder-piston-valve assembly shown in the lower part of Fig. XLVI. In this arrangement the shear arm journal pin 15*bb* is directly attached to the piston rod 75*g*; and the reversing valve 76*g* is moved in one direction—to admit motive fluid to the upper end of the actuating cylinder—by a one way cam and bell crank lever elements, 78—78*a*, and in the other direction (to admit motive fluid to the bottom of that cylinder) by the tappet and walking beam elements 78*b*—78*c*.

The operation of this pneumatically actuated mechanism is as follows: At the proper instant in the cycle of mold movement the cam 78 momentarily engages the lever 78*a* and moves the valve 76*g* to its lowermost position; and the resultant flow of motive fluid from the supply conduit 76*f* to the top of the cylinder 75*b* initiates the concurrent downward and closing (axial and transverse) movements of the cutting elements. As soon as the shear blades have been closed the hooked end lever 77*c* is disengaged from the crank pin 77*b* (as previously explained), and the piston actuated parts are projected downward at a progressively accelerated speed, until the piston engages the end of the tappet rod 78*b* and thus lifts the valve 76*g* to its upper position. This action puts the lower end of the cylinder 75*b* in communication with the live motive fluid conduit 76*f* (and concurrently opens the upper end of the cylinder to the atmosphere) thus immediately cushioning and reversing the movement of the piston actuated parts. Just prior to this pneumatic arrest of the downward movement, the crank arm element 77*g* is engaged by the cam pin 77*f*, and the shear blades are opened in the manner already explained. The connected piston and shear head members are then returned to their upper position—and held in that position by the pneumatic pressure in the lower end of the cylinder—until the cam 78 again engages the lever 78*a*.

In the organizations so far described all of the molds on the press table are supplied with glass from what is known as a "single orifice feeder"—i. e., one in which a single stream of glass flows from a suitable opening in the forehearth and is cut up into successive mold charges by a single shear mechanism—which alternately delivers the requisite quantity of molten material to the staggered units of two sets or banks of molds that are all mounted (at different levels) on one revolving table and are all positioned at the same distance from the axis of rotation. But the generic features of my present invention may be embodied in various other specific forms of feeding and forming apparatus; in which the glass is supplied from "double" (or multiple) "orifice feeders", and in which two or more banks or tiers of molds are mounted either on one table, or on two (or more) tables, at either the same or at different radial distances from the axis, or axes, of movement. A few of many alternative arrangements, which are included among these various exemplifications of my improvements are illustrated—somewhat diagrammatically—in Figs. XLVII to LV, inclusive.

In the organization shown in Figs. XLVII and XLVIII the glass is supplied to the forming machine through two orifices 82, 82*a*, which may be arranged either axially or transversely of the associated forehearth, and each of which is provided with its own shear mechanism (as indicated by dotted lines in Fig. XLVII). The mold charges supplied by one of these orifices and shear assemblies are delivered to the successive units of an upper row of press molds 3, (indicated by full line circles) and the mold charges formed and cut off by the other associated feeder-shear mechanism are delivered to the interposed units of a lower bank of similar molds (3*a*), which are indicated by dotted line circles. There are in this case, six press molds in each bank (twelve in all); and they are all mounted on a single double deck mold table, at a uniform distance from its center. The double deck press table (4) is, as before, positioned inside of an annular double deck blow mold table (6), which carries two banks of mold units (ten in each), that are also positioned at a uniform distance from their axis of rotation. Under such circumstances the two separate paths of travel of the glass bodies—from the point of delivery to the press molds to the point of delivery to the lehr conveyor—are superimposed one on the other (i. e. they both lie in the vertical plane indicated by the heavy dotted line of Fig. XLVII), but are, in this case, of slightly different length since one begins at a point below the orifice 82, and the other at a point below the orifice 82*a*. These two orifices are however relatively close to each other; and the time during which the glass charges remain in the press molds is therefore substantially the same for both sets of these molds.

The molten masses which are successively delivered to the molds 3 and 3*a* are pressed to the desired form by two press assemblies J and J', which correspond, in construction and in functional action, to those already described (supra), and both of which move with the press mold table through an arc P, which is somewhat less than the angular distance between the successive mold (3 or 3*a*) of each series. The upper press assembly (J) differs in no respect from the corresponding one illustrated in Figs. IV, XII, XVI, XVII, XVIII, etc.; but the lower assembly (J') presents—as shown in Fig. XLVIII—certain detail features of structure which differ from those illustrated in Figs. IV, XVII, XIX, XX, XXV, XXVII, etc., and which will now be briefly described.

In the construction shown in Fig. XLVIII the press plunger cylinder 83 is rigidly attached to that part of the press assembly frame (83*a*) which is rotatably mounted on the central column 23 of the press table, and which is also supported by track wheels 73*b*' that roll on the base plate of the machine frame. The press plunger 84, together with its spring pressed follower ring 84*a*, (which cooperate in shaping the blank in the lower tier of press molds 3a), are slidably mounted in an L-shaped frame 84b, which is pivotally supported on a heavy cross bolt 83c, carried by the frame 83a, and which is flexibly coupled to the piston member of a second cylinder 83d that is also carried by this frame (83a). The upper end of the press plunger 84 is coupled to the offset head of a second plunger 84c, which is also slidably mounted in the upwardly extending leg of the L-shaped frame 84b, and which is provided at its lower extremity with a pair of hook-shaped lugs that are adapted to detachably engage a cross bar 83f in the upper enlarged head of the press cylinder piston rod 83e.

The operation of this modified press plunger assembly (J') is as follows: When motive fluid is admitted to the passage 34r (in the manner previously described) it first enters the top of the cylinder 83d and moves the associated piston downwardly, thus swinging the press plunger frame 84b from the dotted line position of Fig. XLVIII to its upright operative position, and locking the frame to the rotating press mold table ( by the engagement of the lugs 84e with the beveled edges of the truncated notches 4f on the peripheral edge of the platform support for the molds 3). At this time the piston member 83e and the plungers 84 and 84c are both held in their elevated positions; and the swinging movement of the frame 84b also effects engagement of the lower end of plunger 84e with the piston rod cross bar 83f. The downward movement of the piston on the cylinder 83a uncovers a port in the cylinder wall, and admits motive fluid to the central chamber of a balanced double piston valve (corresponding in all respects to the valve element 40g, Fig. XIX), which controls the admission and exhaust of motive fluid to and from the ends of the press plunger cylinder 83, and whose position is controlled by a rocking lever 83g that is actuated by fixed cams 83i—83j on the base of the machine frame. These cams are so shaped and positioned that when the press assembly (J') is in its initial position (i. e., at the end of its "arc of return") the double piston valve is raised; and when the communicating port in the cylinder 83d is uncovered, the live motive fluid will pass to the upper end of the cylinder 83 and will force the connected members 83e, 84c and 84 downwardly to effect the shaping of the parison blank (see full line position of Fig. XLVIII). When the frame assembly reaches the end of the "pressing arc" (P) the piston control valve is moved downwardly (by the action of the dotted line cam 83i), and live motive fluid is now admitted to the lower end of the cylinder 83 to lift the press plunger 84 out of the mold 3a. As soon as this occurs the passageway 34r is opened to the atmosphere and the exhaust of motive fluid from the cylinder 83d permits the frame 84b to be swung back to the dotted line position of Fig. XLVIII, under the action of the spring 84k, thus concurrently unlocking the press assembly frame from the press mold table and disengaging the piston rod elements 83e—83f from the plunger member 84c.

It will be understood that the rocking movement of the frame 84b also serves to actuate a valve element 83m (see particularly Fig. XLIX) which is of substantially the same construction as the corresponding valve 36e shown in Fig. XXV, and which serves to control the admission and exhaust of motive fluid to and from an auxiliary power cylinder that assists the rotary movement of the press assembly with the press table. It will also be understood that this assembly is returned to its initial position—after being unlocked from the revolving table—by an arrangement of springs similar to that already described.

In Figs. L and LI I have illustrated another combination of double deck press and blow mold tables, in which the top deck of the press table carries four molds 3, (indicated by full lines in Fig. L) and the lower deck thereof carries five molds 3a (indicated by the dotted lines), which are, as shown, arranged on a circle of larger diameter, and which are therefore displaced both circumferentially and radially of the upper and inner row of molds 3. This assembly of press molds cooperates with two banks of blow molds 5 and 5a, each of which has the same number of units—(i. e., 9 in the upper row, which are indicated by full lines, and 9 in the lower row indicated by dotted lines)—and which are radially offset from each other by the same amount as the two tiers of press molds 3 and 3a. The blow molds are all mounted on a unitary table support and revolve together at the same angular speed; but the peripheral velocity of the upper and lower row of units is necessarily different; and in order to make these velocities equal to those of the cooperating press molds 3 and 3a, the upper and lower decks of the table 4 must be mounted to revolve independently on their central column or shaft support 23; and there must also be a definite relationship between the number of molds on each table and the radial separation or spacing of the upper and lower rows. This necessary relation is expressed by the equation $$r = R\frac{M}{N}\left(\frac{1}{M-(N+1)}\right)$$

where
$R$ = the radial distance from the axis of revolution to the center of one row of press molds.
$r$ = the radial offset of the other row of press molds.
$N$ = the number of press mold units in the annular row of radius $R$.
$N+1$ = the number of press mold units in the annular row of radius $R+r$.
$M$ = number of blow molds in each row.

In the particular arrangement illustrated in Fig. L, $M$ is 9, $N$ is 4, and if one make $R$ 7.5" we have $r = 4.22"$.

In order to equalize the circumferential movement of the centers of the upper row of press molds (3) with that of the corresponding row of blow molds 5 the latter must be arranged on a circle of radius $$R\frac{M}{N}$$

and in order to likewise equalize the movement of the centers of the lower rows of molds 3a and 5a, the latter must be mounted in a circle whose radius is $$(R+r)\left(\frac{M}{N+1}\right) \text{ or is } R\left(\frac{M}{N}\right)+r$$

When this is done the two decks of the press table 4 may be connected to the blow mold table 6 by the two pairs of interconnected external and internal gears 4f—6f and 4g—6g, whose pitch diameters are in the ratio of $N:M$, and $N+1:M$ respectively.

The mold charges of molten glass are successively delivered to the upper and lower press mold units from the two delivery openings 82b and 82c of a twin orifice feeder; and are shaped to the desired form therein, by two independently operating press plunger assemblies J and J', which move with the press table through the respective arcs P and P'. Since the path of movement of the lower press plunger 85a and of its associated follower ring 85b is, in this case, entirely outside of the path of movement of the upper press plunger 85 and of the press molds 3 with which it cooperates, it is unnecessary to move the lower press assembly frame to one side, in order to permit its return movement. This simplifies the construction of this frame and permits it to be suspended from an overhead bearing on the table column 23. Both of the press plunger assemblies of this apparatus are, of course, provided with suitable locking cylinders and with auxiliary power cylinders similar to those employed in conjunction with the previously described constructions;—the locking and rotating mechanisms of the upper press assembly cooperating with the upper deck of the table 4; and the corresponding mechanisms of the lower press assembly cooperating with the independently revolving lower deck table 4a.

It is apparent that in the construction now under consideration the diameter of the press plunger cylinders cannot be greater than the radial offset (r) between the paths of movement of the two rows of press molds 3 and 3a. It is therefore advantageous to employ, in some cases, two pairs of press cylinders 85c—85c (or 85d—85d), whose axes lie in the plane of movement of the associated press mold centers, and which are connected in parallel to the press plungers 85 and 85a.

Fig. LII is a diagrammatic illustration of another combination of a twin orifice feeder with a double deck assembly of press molds and blow molds. In the arrangement there shown there are two banks of press mold units (five in each bank) which are all mounted on a common table support—and which therefore revolve in unison—and two banks of cooperating blow mold units, the upper of which contains 9 units (as indicated by full lines at 5—5, etc.), and the other of which contains only 8 molds (as indicated by dotted lines at 5a—5a, etc.). The two sets of press molds (3 and 3a) and the two cooperating banks of blow molds (5 and 5a) are both radially offset by the same amounts (r); and the relation between this offset and the distance of the centers of the molds from their respective axes of rotation (i. e., the axes of the mold tables 4 and 6) is such that the peripheral spacing of the molds 3—3 is the same as that of the molds 5—5, and the corresponding spacing of the molds 3a—3a is equal to that of the molds 5a—5a. This condition is satisfied when $$r = \frac{R}{M-(N+1)}$$

where the symbols r, R, M, and N represent the same quantities as in the equation previously given.

The two sets of press molds 3 and 3a—which as previously stated revolve together at the same angular speed—may be arranged with their respective units in staggered relation; but as here shown, they are positioned in pairs in coincident radial planes. Under such circumstances each pair of press molds may be simultaneously charged with glass from the twin orifices 82d—82e of the feeder mechanism; and these charges may also be concurrently shaped to form by a double plunger press mechanism J2, which is locked to the press table and moved therewith through the angle P2. It is also apparent that these pressed parison charges may be simultaneously transferred from each pair of press mold units to a concurrently coincident pair of blow mold units (5 and 5a) at the point T; but that in order to bring each of the lower blow molds (5a) into successive radial coincidence with one of the upper blow molds (5) the two sets (5 and 5a) must be mounted on independently rotatable decks; which are geared to the unitary press mold table 4 in the manner indicated in Fig. LI; save that in this case the gears 4f and 4g revolve in unison, and the gears 6f and 6g are connected to and revolve with structurally separated parts of the double deck table 6.

Fig. LV (Sheet 1) diagrammatically illustrates still another combination of a twin orifice feeder with two joint assemblies of pressing and blowing units, each of which comprises a double deck press mold table and a cooperating double deck blow mold table;—all of these parts being mounted on one frame and operated in the desired cooperative relationship by a common driving means. In this case also two press molds may be coincidently charged with glass from the twin orifices (82f and 82g) of the feeder; or the phase relationship of the table movements may be so changed that the delivery of the mold charges to the successively presented molds may occur in any desired sequence.

It is obvious that in all cases where twin orifice feeders are used as a part of my improved apparatus, shear mechanisms must be provided for either concurrently severing mold charges from the two separate streams of molten material, as in the suggested operations of the apparatus shown in Fig. LII, or for alternately cutting off and delivering such charges to successively presented molds, as in the operation of the apparatus shown in Figs. XLVII and L. The simultaneous severance of the two streams from the twin orifices, (82d—82e, or 82f—82g, etc.), may be readily effected by a single shear mechanism whose blades are provided with a pair of properly spaced cutting edges, such as are indicated in dotted lines in Fig. LII, that are adapted to concurrently engage the separate streams when the blades are closed; but as this particular form of shear mechanism forms no part of my present improvements it is not specifically illustrated. The periodic or alternate delivery of the mold charges supplied by the twin orifice feeder to successively presented molds (on either the same or on different press mold tables) is best effected by a pair of independently controllable shear assemblies, both of which may be of the form shown, for example, in Figs. LIII and LIV, or which may be of the general character shown in Figs. XLI to XLV inclusive. The construction shown in Figs. LIII and LIV will now be briefly described.

The combined severing and accelerated delivery mechanism illustrated—in part only diagrammatically—in Fig. LIII, comprises a pair of "cat's eye" shear blades 87 which are attached to arms that are pivotally mounted on the head 87a, and which are provided with cylindrical guard cups 87b that are adapted to embrace the severed charge when the shear blades are closed. These parts are substantially the same, in construction and arrangement as those shown in Fig. XLV and do not therefore require further description. The shear head 87a is supported and guided by a pair of parallel links 87c which are pivotally attached, at their upper ends, to the head, and at their opposite ends, to a cylinder 88 that is slidably mounted on a fixed piston and piston rod 88a carried by a suitable bracket 88b on the machine frame. The centers of the parallel link elements 87c are pivotally connected to a shorter link 87d that is journaled at a fixed point on the stationary bracket 88b, and the relationship of the several interconnected parts is such that as the cylinder 88 is moved backward—or away from the supporting member 88b—the head 87a will be moved downward, parallel to itself, along the curved line 89—89a; and will thereby impart to the charge embraced by the guard cups 87b, a combined vertical and lateral acceleration which is similar in character to that obtained by the use of the first described shear mechanism (see Figs. VI to X).

The movement of the cylinder 88 may be effected either mechanically by suitable cams on the drive shaft S of the machine, or pneumatically, by admitting motive fluid to the ends of the cylinder through suitable passageways and ports in the stationary piston rod 88a. When operated in the last mentioned manner, the admission and exhaust of the motive fluid to and from the cylinder is controlled by suitable valves, (similar to those previously described in connection with the mechanism shown in Figs. VI to X), which are actuated by timing cams on the shaft S.

The shear mechanism last described is mounted with its head 87a on the rear side of the flow orifice 82 (see Fig. XLVII), and with its longitudinal center plane (L—L) tangent to the path of movement of the press mold centers and is operated as follows: When a receiving mold (3 or 3a) arrives at a proper point below the orifice 82 motive fluid is admitted to the rear end of the cylinder 88 and the latter is moved away from the support 88b, thus initiating the downward movement of the head 87a. This initial downward movement closes the shear blades in the manner explained in the previous description of Fig. XLV, and engages the guard cups 87b with the severed mold charge. The continued rearward movement of the cylinder (88) imparts a very rapidly accelerated movement to the shear head and its associated parts along the curved path 89—89a. At the end of this accelerated downward movement the shear blades are opened by the action of a suitably, positioned cam pin 87e (see description of Fig. XLV, supra) and the valve element which controls the flow of motive fluid to the front end of the cylinder 88 is concurrently opened. The resultant admission of compressed air (or other suitable motive fluid) to this end of the rearwardly moving cylinder, first cushions and arrests, and then reverses this movement; (the opposite end of the cylinder being now open to the atmosphere), and returns the cylinder actuated parts to their initial position ready for a repetition of the above described cycle of action.

The shear mechanism which is used in conjunction with the delivery orifice 82a is in all respects the same as the one shown in Fig. LIII, except that the radius guide link 87f, which is pivotally connected to the center of the parallel links 87c, is longer than the link 87d and is journaled on the bracket support 88b at a point below the axis of the cylinder 88 (see Fig. LIV). These changes result in forced movement of the shear head and its associated parts along the curved path 89—89b (instead of along the path 89—89a of Fig. LIII)—and when this shear mechanism is positioned with its head (87aa) in advance of the delivery orifice 82a (but in the same longitudinal plane, L—L, therewith) the charges severed by it are also given a forward acceleration in the line of travel of the receiving molds.

The characteristic features of this invention—as exemplified by the various embodiments hereinbefore described—should now be clearly understood by those skilled in this art; and is should be apparent that these improvements may be utilized, in whole or in part, in the construction of various other forms of apparatus. It is for example obvious that the "double deck" feature of construction—and the mode of operation involved in its utilization—may be embodied in machines that are not of the "annular drum" type—e. g. machines in which the press mold table is mounted exteriorly of the blow mold table, instead of inside it, and also to press and blow machines of the coaxial parison and blow mold species—and that various other changes in the form and arrangement of the cooperating parts may be made without departing from the spirit of the invention as defined by the appended claims.

What I claim as new and desire to secure by Letters Patent is:

1. A glass fabricating machine comprising a mold carrying table, a fixed column about which such table rotates, neck and blank molds carried by said table, and means carried by said column for cooperating with each such mold in forming mold blanks, in combination with an annular table surrounding said mold carrying table and arranged eccentrically thereto, finishing molds carried by said annular table, means carried by said annular table and cooperating with the molds carried thereby for completing blank molds into finished articles, means for rotating both tables and means operating in timed relation for closing each mold carried by the annular table about a blank carried by a neck mold and for opening the neck mold carrying such blank while both tables are rotating.

2. In a glass fabricating machine, a double deck press table, an annular series of neck and blank molds carried by each deck of such table, separate means for opening and closing each such neck and blank mold, means for continuously rotating said table, a single feeder for alternately delivering mold charges to molds carried by each deck, a rotatably mounted double deck finishing table, a series of finishing molds carried by each deck of said table, means for opening and closing said finishing molds, means for operatively connecting both tables and timed means for controlling the opening and closing of the molds on both tables for effecting a transfer of a blank from a neck mold carried by one deck of the press table to a finishing mold carried by the corresponding deck of the finishing table and then for accomplishing a transfer of such a blank from and to molds carried by the other decks of said tables.

3. In a glass fabricating machine, a double deck press table, a series of cooperating neck and blank molds carried by each deck of said table, means for continuously rotating said table, a single feeder for alternately delivering successive charges to molds carried by each deck, a rotatable, double deck finishing table, a series of finishing molds carried by each deck of said table, and cooperating with molds carried by the corresponding deck of the press table, and means for accomplishing a transfer of a blank from a neck mold carried by one deck of the press table to a finishing mold carried by the corresponding deck of the finishing table and then of a blank from a neck mold carried by the other deck of said table to a finishing mold carried by the corresponding deck of the finishing table and means for continuously rotating both tables.

4. In a glass fabricating machine, a multiple deck press table, a separate series of molds carried by each deck of said table, and a single feeding means for delivering mold charges to the molds of all decks, a multiple deck finishing table with each deck thereof arranged to cooperate with a deck of the press table, a separate series of finishing molds carried by each deck of the finishing table, means for accomplishing a transfer of blanks from molds of each deck of the press table to molds of corresponding decks of the finishing table, and means for continuously rotating both tables.

5. In combination with a rotatable table, a series of mold units carried by said table, a press plunger for successively cooperating with the successive units of said series, means for actuating said plunger, means for continuously rotating said table and independent means for swinging said plunger and said plunger actuating means with said table during each pressing operation and for returning the same to its initial position after each pressing operation.

6. In combination with a rotatable table, a series of molds carried thereby, means for continuously rotating said table, a press plunger assembly mounted to swing about the axis of rotation of said table, means for periodically locking said assembly to and disengaging it from said table, and means, independent of the driving means of said table, for initiating each swing of said plunger assembly.

7. The combination with a rotatable table, driving means therefor and a series of molds carried thereby, of a press plunger assembly mounted to swing about the axis of rotation of said table and including a press plunger, means for actuating said plunger to successively cooperate with each successive mold of said series, means for locking said assembly to said table prior to each such cooperative action, means independent of the driving means of said table for initiating each swing of said plunger assembly with said table, means for tilting said assembly after each pressing operation, and means for swinging said assembly to an initial position while so tilted.

8. In combination with a rotatable table, means for continuously rotating said table, a series of molds carried thereby, a press assembly mounted to swing about the axis of rotation of said table and including a press plunger adapted to cooperate with the successive molds of said table, means for periodically locking said assembly to said table and interacting means, independent of the driving means for said table, for actuating said plunger and said locking means.

9. In combination with a rotatable table, driving means therefor, a series of molds carried thereby, a press plunger assembly including a two-part frame mounted to swing through an arc about the axis of rotation of said table, one portion of said frame being tiltable with relation to the other, a press plunger carried by said tiltable portion, interacting means, independent of the driving means of said table, for actuating said plunger, for tilting and righting the tiltable portion of said assembly and for locking said assembly to said table and for unlocking the same.

10. The combination in a glass fabricating machine, of a rotatable table, a plurality of molds carried thereby, means for continuously rotating said table, a press assembly mounted to swing about the axis of rotation of said table, and comprising a press plunger and means for operating said plunger, means for periodically locking said assembly to said table, means for initiating each swing of said assembly with said table, and interacting means for controlling the operation of said locking means and said plunger actuating means.

11. In combination in a glass fabricating machine, a rotatable table, a plurality of molds carried thereby, each comprising a pair of hinged neck ring sections and a pair of hinged body sections, an annular table surrounding said first mentioned table, a plurality of blow molds carried by said annular table and each comprising a pair of hinged sections, means for rotating both tables, said molds and tables being so located that a portion of the path of travel defined by the centers of the closed neck ring sections is substantially coincident with a portion of the path of travel defined by the centers of the closed blow molds, means for opening the body sections of the molds carried by the first mentioned table as each such mold approaches the substantially coincident portions of the paths of travel, means for opening each pair of neck ring sections while such sections are traversing such substantially coincident portion, and means for closing each pair of blow mold sections as each such pair is traversing such substantially coincident portion.

12. In combination in a glass fabricating machine, a blow mold comprising hinged body sections, a blow head secured to the hinge pin of said body sections, means for opening and closing said body sections, means for raising and lowering said hinge pin to move said blow head into and out of engagement with said closed body sections and means for rotating said hinge pin to swing said blow head through a complete circle while in raised position.

13. In combination in a glass fabricating machine, a blow mold comprising hinged body sections, a blow head, a shaft to which said blow head is secured, means for opening and closing said body sections, means for reciprocating said shaft to move said blow head into and out of engagement with said closed body sections, and means for rotating said shaft to swing said blow head through a complete circle while in raised position.

14. In combination in a glass fabricating machine, a blow mold comprising hinged body sections, a blow head, a hollow rotatable shaft to which said blow head is secured, means for opening and closing said body sections, means for reciprocating said shaft to move said blow head into and out of engagement with said closed body sections, and means for rotating said shaft to swing said blow head through a complete circle while in raised position, said hollow shaft being in open communication with said blow head and having a port therein adapted to be uncovered when said blow head is in engagement with said closed body section to establish communication between said blow mold and a source of fluid pressure.

15. In combination in a glass fabricating machine, a blow mold including hinged body sections, a blow head, a hollow shaft to which said blow head is secured, means for opening and closing said body sections, means for raising and lowering said shaft to move said blow head into and out of engagement with said closed body sections, means for rotating said shaft through a complete circle while said blow head is raised, and means for introducing fluid pressure through said shaft and into said blow mold while said head is in engagement with said closed body sections.

16. In a glass fabricating machine according to claim 11 in which a blow head is provided for each blow mold which moves out of the path of travel of the blow mold as the molds approach such substantially coincident portion and back onto such mold as the blow mold moves away from such coincident portion.

17. In a glass fabricating machine according to claim 11 in which a blow head is provided for each blow mold which is raised out of engagement with the blow mold and turned 180° as the blow mold approaches the coincident portion, and is then turned another 180° in the same direction and lowered into engagement with the blow mold as the mold leaves such coincident portion.

18. A glass fabricating machine comprising a substantially circular table, cooperating neck and blank molds carried by said table, a plunger for shaping the charges in said blank and neck molds, an annular mold carrying table surrounding said first mentioned table and arranged eccentrically thereto, divided finishing molds carried by said annular table, means for continuously rotating both tables, means for oscillating said plunger to cause it to travel first in the direction of rotation of said circular table and then in the opposite direction, means for opening said blank molds, and means for closing each finishing mold about a blank carried by a neck mold, and effecting a transfer of such blank thereto by opening such neck mold while both tables are moving.

19. A glass fabricating machine comprising a table having a series of cooperating neck and blank molds therein, each of which is divided and adapted to be opened and closed independently of the other, a finishing table surrounding said first mentioned table and having a series of divided blow molds thereon adapted to be opened and closed, said finishing table being eccentric to said first table and so arranged relative thereto that the centers of the molds on each table traverse the same arcuate path for a portion of their travel, means for rotating said tables at the same peripheral speed, means carried by one such table and cooperating with the molds carried thereby for forming mold blanks, means carried by the other table and cooperating with the molds thereof for completing the fabrication of such blanks into finished articles, means for opening such blank molds prior to the movement thereof into the common arcuate path, and means operating in timed relation for closing a blow mold about a blank carried by the neck mold and for opening such neck mold to effect a transfer of such blank while both tables are moving.

20. A glass fabricating machine according to claim 19 in which a reciprocating plunger cooperates with the neck and blank molds to form the blanks and which travels with the table while in its lowered pressing position and in the opposite direction when in its raised and inoperative position.

21. A glass fabricating machine according to claim 19 in which a reciprocating plunger is employed to form the blanks which is locked to and travels with the table during the pressing operation and which is unlocked from the table and travels in an opposite direction in its raised and inoperative position.

22. A glass fabricating machine according to claim 19 in which a plunger is adapted to cooperate with the blank mold to form the blanks which is mounted for both reciprocable and oscillatory movement relative to the table carrying the blank molds.

23. In a glass fabricating machine a rotatable press table having a series of blank molds thereon, a rotatable finishing table surrounding said pressing table and arranged eccentrically thereto, a series of blow molds carried by said finishing table and arranged to travel through an arc coincident with the arc of travel of the blank molds on said press table, means for rotating said tables to move the molds carried thereby at the same peripheral speed, and means operating in timed relation for closing a blow mold on said finishing table and opening a blank mold on said press table while said molds are moving through the coincident arc of travel to effect a transfer of a blank from one table to the other.

24. In a glass fabricating machine a rotatable press table having a series of partible blank molds each of which includes a body section and a neck ring section, a rotatable finishing table surrounding said pressing table and arranged eccentrically thereto, a series of partible blow molds carried by said finishing table and arranged to travel through an arc coincident with the arc of travel of the blank molds on said press table, means for continuously rotating said tables to move the molds carried thereby at the same peripheral speed, means for opening and closing the body section of each said blank mold, means for closing a blow mold on said finishing table while moving through such coincident arc, and means operating in timed relation to said last mentioned means to open a neck ring section of the blank mold moving along such coincident arc to effect a transfer of a blank from the press table to the finishing table.

25. A glass fabricating machine comprising a rotatable press table having a series of blank molds thereon, means for continuously rotating said table to move the molds thereon in a circular path from a charge-receiving position to a blank-delivery position, means for pressing charges delivered to said molds at the charge-receiving position, a rotatable finishing table surrounding said press table and arranged eccentrically thereto, a series of blow molds carried by said finishing table and arranged to travel through an arc coincident with a portion of the circular path of said blank molds at the blank delivery position, means for rotating said finishing table to move the blow molds thereon at the same peripheral speed as the blank molds, means operating in timed relation for closing a mold carried by the finishing table and opening a mold carried by the press table to effect a transfer of a blank while such molds are moving through such coincident arc of travel, means for introducing air into each blow mold to blow the blank therein, means for opening each blow mold, and continuously moving means for lifting the finished articles from said blow molds and transferring the same away from said finishing table.

26. A glass fabricating machine as claimed in claim 25 in which a plunger is employed to shape the charges in the blank molds, said plunger being oscillated and reciprocated.

27. A glass fabricating machine as claimed in claim 25 in which means are provided which cooperate with the blow molds for completing the fabrication of the blanks transferred thereto.

28. A glass fabricating machine as claimed in claim 25 in which a reciprocable and rotatable blow head is provided for each blow mold on the finishing table.

29. A glass fabricating machine as claimed in claim 25 in which a plunger is provided for shaping the blanks in the blank mold and a blow head is provided for each of the blow molds on the finishing table.

30. A glass fabricating machine as claimed in claim 25 in which the blank molds include a body section and a neck ring section and a reciprocating plunger is employed to shape the charges in the blank molds, said plunger having a sleeve cooperating therewith for closing the upper end of the neck ring section during the operation.

31. A glass fabricating machine as claimed in claim 25 in which an oscillating and reciprocating plunger is provided for pressing the charges in the blank molds which plunger travels with the press table during the pressing operation and is tilted away from said table while the plunger is moving in the opposite direction.

32. A glass fabricating machine as claimed in claim 25 in which a plunger is provided for pressing the charges in the blank mold which plunger travels with the press table during the pressing operation and is tilted away from the press table and returned to its initial position after the completion of the pressing operation.

33. In a glass fabricating machine, the combination of a continuously rotating press mold table, a continuously rotating blow mold table mounted eccentrically of and surrounding the first mentioned table, a series of molds carried by each table, means for revolving both tables at the same peripheral speed of mold travel, a press assembly mounted coaxially of said press mold table, means for alternately moving said assembly with said table and in the reverse direction thereto.

34. In combination in a press mold table carrying a concentrically arranged series of blank molds, an annular blow mold table surrounding the press mold table and mounted to revolve eccentrically thereof, a series of blow molds mounted on said last mentioned table, means for concurrently moving both of said tables at the same peripheral speed of mold travel, a press assembly mounted to revolve concentrically with the press mold table, means for alternately moving said assembly with said table and reversely with respect thereto, and means for removing finished articles from the blow molds.

FRANK L. O. WADSWORTH.